(12) United States Patent
Beyer et al.

(10) Patent No.: US 11,805,914 B2
(45) Date of Patent: Nov. 7, 2023

(54) BACK SUPPORT FOR A CHAIR

(71) Applicant: Haworth, Inc., Holland, MI (US)

(72) Inventors: Peter J. Beyer, Hamilton, MI (US);
Kyle R. Fleet, Byron Center, MI (US);
Michael E. Schasel, Zeeland, MI (US);
Todd A. Kercher, Holland, MI (US);
Brian S. Gessler, Hudsonville, MI (US); Teresa A. Bellingar, Holland, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 16/909,155

(22) Filed: Jun. 23, 2020

(65) Prior Publication Data
US 2020/0315354 A1    Oct. 8, 2020

Related U.S. Application Data

(62) Division of application No. 16/220,181, filed on Dec. 14, 2018, now Pat. No. 10,729,250, which is a
(Continued)

(51) Int. Cl.
*A47C 7/46* (2006.01)
*A47C 7/40* (2006.01)
(Continued)

(52) U.S. Cl.
CPC ............... *A47C 7/462* (2013.01); *A47C 7/40* (2013.01); *B68G 5/00* (2013.01); *B29C 45/00* (2013.01); *B29L 2031/771* (2013.01)

(58) Field of Classification Search
CPC .. A47C 7/462; A47C 7/46; A47C 7/40; B68G 5/00; B29C 45/00; B29L 2031/771
See application file for complete search history.

(56) References Cited

U.S. PATENT DOCUMENTS 3,353,869 A    11/1967 Getz et al.
3,476,169 A    11/1969 Militano
(Continued)

FOREIGN PATENT DOCUMENTS

CN    2168479    6/1994
CN    1331940    1/2002
(Continued)

*Primary Examiner* — Philip F Gabler
(74) *Attorney, Agent, or Firm* — Warner Norcross + Judd LLP

(57) ABSTRACT

An office-type chair including a back support having a suspension mesh back support and a back support frame. The suspension mesh back support has an integral retaining channel disposed at a peripheral edge thereof, and the back support frame includes a central pair of upright support posts and wedge base for mounting to a chair frame. The back support frame includes a plurality of flexible and spaced support arms extending laterally outward from the upright support posts. The support arms each have a peripheral edge configured for fastenerless attachment in a tensioned state within the suspension mesh retaining channel. An upholstery cover encapsulates the suspension mesh and back support frame. The office chair also includes a lumbar mechanism including a resilient cushion that may be positioned in the space between the suspension mesh and the support frame and adjusted along the vertical extent of the back support by rolling the resilient cushion on the rear of the suspension mesh.

14 Claims, 20 Drawing Sheets

Related U.S. Application Data division of application No. 15/042,723, filed on Feb. 12, 2016, now Pat. No. 10,182,657.

(51) Int. Cl.
  *B68G 5/00* (2006.01)
  *B29C 45/00* (2006.01)
  *B29L 31/00* (2006.01)

(56) References Cited

U.S. PATENT DOCUMENTS

| | | | |
|---|---|---|---|
| 3,642,319 A * | 2/1972 | Berchicci | A47C 7/462 |
| | | | 297/284.4 |
| 4,049,315 A | 9/1977 | Jacobson | |
| 4,408,800 A | 10/1983 | Knapp | |
| 4,556,254 A | 12/1985 | Roberts | |
| 4,658,807 A | 4/1987 | Swain | |
| 4,744,603 A | 5/1988 | Knoblock | |
| 4,925,242 A * | 5/1990 | Harris | A61G 5/1054 |
| | | | 297/284.4 |
| 5,320,410 A | 6/1994 | Faiks et al. | |
| 5,403,067 A | 4/1995 | Rajaratnam | |
| 5,586,808 A | 12/1996 | Oelke | |
| 5,645,321 A | 7/1997 | Seroldi | |
| 5,826,937 A | 10/1998 | Massara | |
| 5,951,109 A | 9/1999 | Roslund et al. | |
| 5,988,757 A | 11/1999 | Vishey et al. | |
| 6,039,705 A * | 3/2000 | Wu | A47C 7/46 |
| | | | 601/102 |
| 6,059,368 A | 5/2000 | Stumpf et al. | |
| 6,485,443 B1 * | 11/2002 | Garth | A47C 7/46 |
| | | | 601/99 |
| 6,572,190 B2 | 6/2003 | Koepke et al. | |
| 6,663,177 B2 | 12/2003 | Bianco et al. | |
| 6,910,736 B2 | 6/2005 | White | |
| 6,971,717 B1 | 12/2005 | Rhodes | |
| 7,032,971 B2 | 4/2006 | Williams | |
| 7,234,773 B2 | 6/2007 | Raftery et al. | |
| 7,249,802 B2 | 7/2007 | Schmitz et al. | |
| 7,347,495 B2 | 3/2008 | Beyer et al. | |
| 7,396,438 B2 | 7/2008 | Scobie | |
| 7,712,833 B2 | 5/2010 | Ueda | |
| 7,909,402 B2 | 3/2011 | Chu et al. | |
| 7,967,381 B2 * | 6/2011 | Sugiyama | B60N 2/665 |
| | | | 297/284.4 |
| 8,590,978 B2 | 11/2013 | Jaranson et al. | |
| 8,622,472 B2 | 1/2014 | Rajaratnam | |
| 8,845,025 B2 | 9/2014 | Kurata et al. | |
| 9,131,777 B2 * | 9/2015 | Muck | B60N 2/666 |
| 9,332,851 B2 | 5/2016 | Machael et al. | |
| 9,504,325 B2 | 11/2016 | Sander et al. | |
| 9,578,968 B2 | 2/2017 | Masunaga et al. | |
| 10,004,337 B2 * | 6/2018 | Grove | A61H 15/00 |
| 10,182,657 B2 * | 1/2019 | Beyer | A47C 31/023 |
| 10,485,727 B2 * | 11/2019 | Grove | A47C 7/44 |
| 10,729,250 B2 * | 8/2020 | Beyer | A47C 7/40 |
| 2001/0008955 A1 | 7/2001 | Garth | |
| 2002/0089219 A1 * | 7/2002 | Blanco | B60N 2/4263 |
| | | | 297/284.4 |
| 2002/0130540 A1 | 9/2002 | Rajasingham | |
| 2002/0190552 A1 | 12/2002 | Koepke et al. | |
| 2004/0007910 A1 | 1/2004 | Skelly | |
| 2004/0104610 A1 | 6/2004 | Jaskot et al. | |
| 2004/0195882 A1 | 10/2004 | White | |
| 2004/0256899 A1 | 12/2004 | Moore et al. | |
| 2005/0062323 A1 | 3/2005 | Dicks | |
| 2005/0104428 A1 | 5/2005 | Walker et al. | |
| 2005/0179292 A1 | 8/2005 | Knoblock et al. | |
| 2006/0103214 A1 | 5/2006 | Andersson et al. | |
| 2006/0181126 A1 | 8/2006 | Eysing | |
| 2006/0255635 A1 | 11/2006 | Iijima et al. | |
| 2007/0102987 A1 | 5/2007 | Chen | |
| 2008/0296945 A1 | 12/2008 | Bedford et al. | |
| 2009/0085388 A1 | 4/2009 | Parker et al. | |
| 2009/0102268 A1 | 4/2009 | Schmitz et al. | |
| 2009/0261644 A1 | 10/2009 | Piretti | |
| 2010/0187882 A1 | 7/2010 | Chen | |
| 2012/0061988 A1 | 3/2012 | Jaranson et al. | |
| 2012/0299350 A1 | 11/2012 | Willingham | |
| 2013/0221724 A1 | 8/2013 | Fowler | |
| 2014/0062154 A1 | 3/2014 | Minino et al. | |
| 2014/0110983 A1 | 4/2014 | Sander et al. | |
| 2014/0117738 A1 | 5/2014 | Takahashi et al. | |
| 2014/0183914 A1 | 7/2014 | Cvek | |
| 2014/0265493 A1 | 9/2014 | Machael et al. | |
| 2015/0008712 A1 | 1/2015 | Cardona | |
| 2015/0011567 A1 | 4/2015 | Muck | |
| 2015/0296989 A1 * | 10/2015 | Machael | A47C 7/46 |
| | | | 297/284.7 |
| 2016/0029801 A1 | 2/2016 | Potrykus et al. | |
| 2019/0133328 A1 | 5/2019 | Beyer et al. | |

FOREIGN PATENT DOCUMENTS

| | | |
|---|---|---|
| CN | 1470420 | 1/2004 |
| CN | 1564666 | 1/2005 |
| CN | 1575142 | 2/2005 |
| CN | 101715310 | 5/2010 |
| DE | 10 2007 002 284 | 7/2008 |
| DE | 10 2008 009 509 | 8/2009 |
| DE | 10 2011 100 708 | 11/2012 |
| EP | 1 232 703 | 8/2002 |
| EP | 1 693 248 | 8/2006 |
| EP | 1 785 070 | 5/2007 |
| EP | 1 911 374 | 4/2008 |
| EP | 1 946 676 | 7/2008 |
| GB | 199756 A | 7/1970 |
| WO | 92/12654 | 8/1992 |
| WO | 98/48670 | 11/1998 |
| WO | 98/48671 | 11/1998 |
| WO | 00/22961 | 4/2000 |
| WO | 03/063651 | 8/2003 |
| WO | 2010/120139 | 10/2010 |
| WO | 2011/037431 | 3/2011 |
| WO | 2012/167940 | 12/2012 |

\* cited by examiner

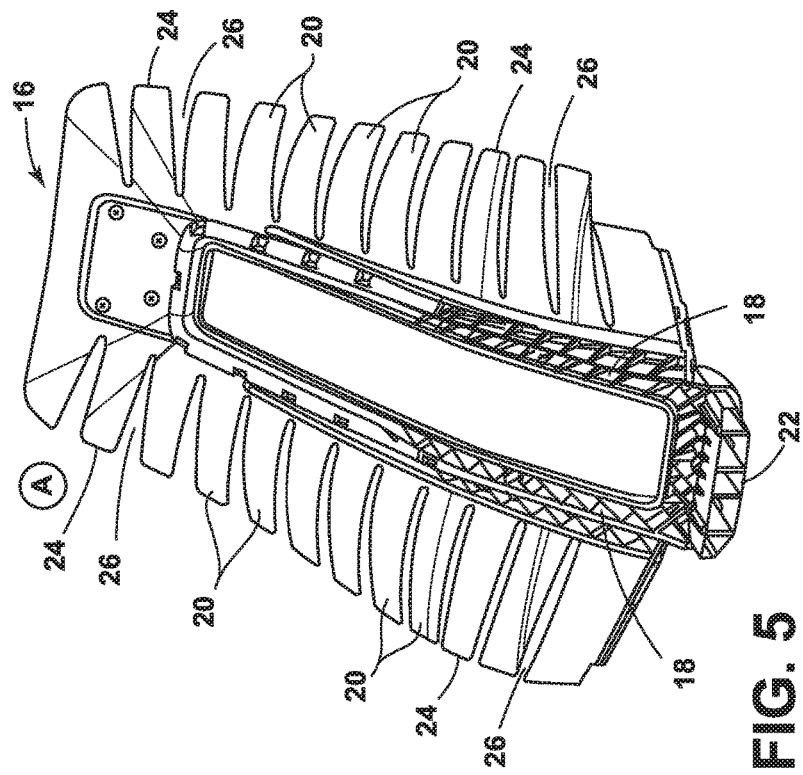
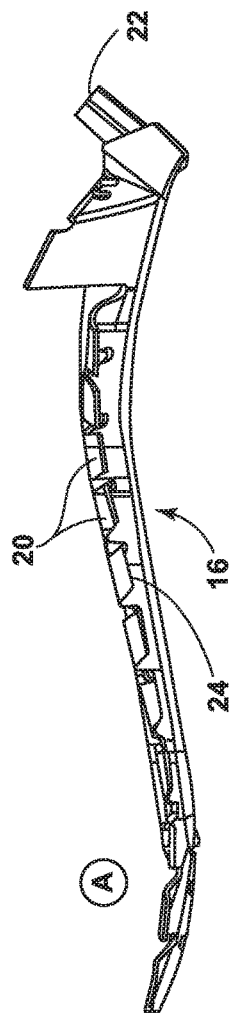
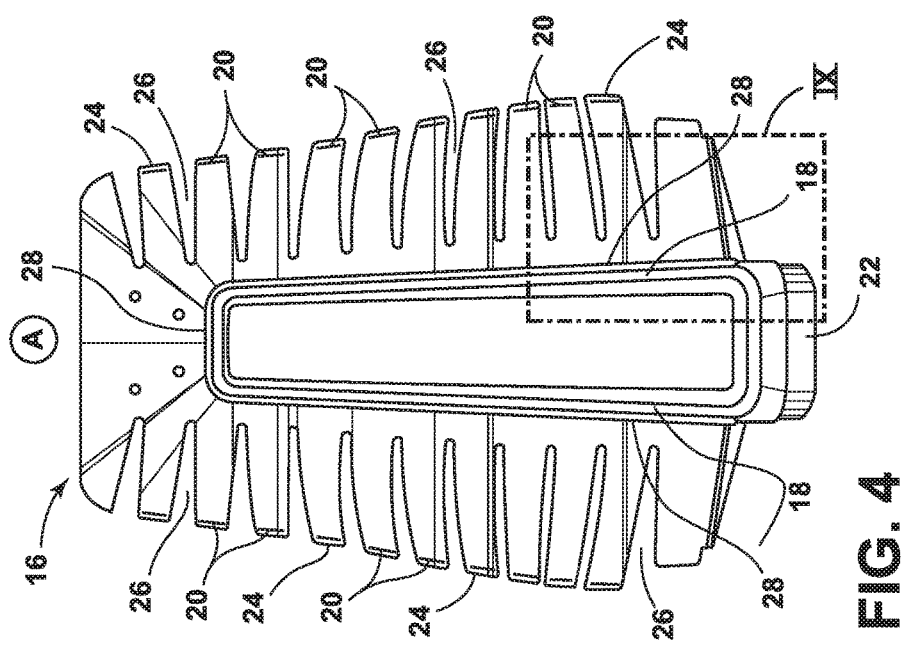
FIG. 5
FIG. 6
FIG. 4

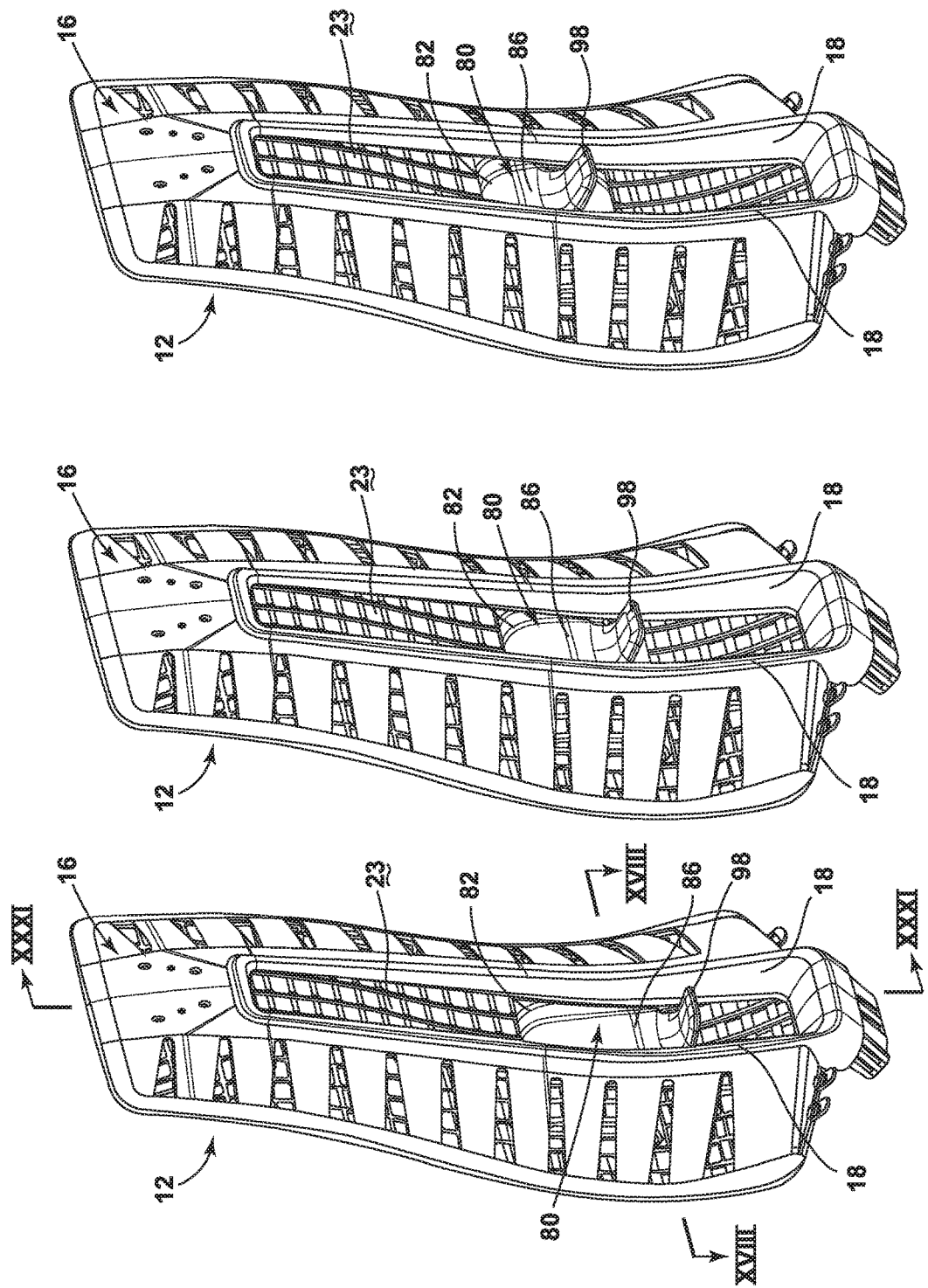

BACK SUPPORT FOR A CHAIR

BACKGROUND OF THE INVENTION

The present invention relates to an office chair and more particularly, to an office chair that provides a flexible backrest portion of an office chair.

The market for office seating continues to demand more than just a place to sit. Today's users want comfort, function, and adjustability, all in an aesthetically pleasing configuration. More recently, it is known for office chairs to have a back support structure that includes a flexible material, such as a woven mesh fabric, attached in tension to a peripheral frame. These arrangements can provide a high degree of comfort, even over extended periods of time. They are, however, typically limited by the relative rigidity of the peripheral frames, and the relative cushioning of the woven mesh fabric. The frame must generally be rigid in order to support the mesh fabric in tension, and the rigidity places limits on the flexibility of the back support. In some instances, a rigid peripheral frame may be uncomfortable for an occupant and prevent flexibility as the occupant attempts to adjust their posture while seated. As such, manufacturers and users alike may seek a degree of torsional flexibility in the back support for added comfort and increased range of movement while seated in the office chair, while retaining the long term comfort and cushioning that the tensioned fabric provides.

SUMMARY OF THE INVENTION

The present invention provides a back support that includes a support frame and a suspension mesh material that are specifically designed to work with one another to provide desired support characteristics and torsional flexibility for an occupant while sitting in the associated chair. The frame may have a flexible portion that supports the suspension mesh material in tension. The mesh material may be molded and flexible. These components can be individually tuned to provide the back support with desired support characteristics, including variations in shape and support at different locations on the back support. In one embodiment, an upholstery cover may overlie at least a portion of the suspension mesh. The characteristics of the cover are such that it does not impede the flexible relationship of the frame and the suspension mesh.

In one embodiment, the flexible portion of the back support frame is formed by a plurality of flexible and spaced support arms that extend outwardly from one or more upright support posts. The support arms may each have peripheral edges that form the periphery of the frame. The support arms are spaced apart from one another such that each of the support arms can be independently flexed at the periphery. The one or more upright support posts may include a pair of spaced apart support posts that generally define a central opening therebetween, wherein the support arms may extend outwardly from one of the upright posts. In such an embodiment with two spaced apart support posts, the posts may each form an axis about which each support post can twist—independent of one another—in response to movements by a user that place a load on the support arms extending from one or the other of the support posts.

The suspension mesh may be supported in tension by the flexible portion of the back support frame—without the need for a rigid peripheral frame. In one embodiment, the suspension mesh has an integral retaining channel disposed at a periphery thereof, which is configured for fastenerless attachment to the peripheral edges of the support arms in order to hold the suspension mesh in a tensioned state with respect to the support frame. The support arms may be flexed from a first "pre-tensioned" position into a second tensioned position when the suspension mesh is mounted to the support arms. In this tensioned position, the support arms may allow the back support to promote a desired ergonomic contour, and further provide the back support with desired support characteristics. The tensioning of the supports arms prior to the user sitting in the chair creates a predetermined reactionary force that biases the suspension mesh towards the ergonomic contour when a user places a load on the back support. More particularly, the tensioning of the support arms provides a reactionary force that increases exponentially with an increase in load from a user, such that the back support accommodates a wide variety of users and user types.

In another embodiment, the suspension mesh is a molded material that includes spaced horizontal tensioning support members and spaced vertical tensioning support members that together form a flexible mesh that distributes the load placed on the back support by the user. The support characteristics provided by the suspension mesh may be tuned as desired by varying one or more of a number of features of the mesh including the width, thickness, spacing and a pattern of the horizontal and vertical support members.

The fabric cover may be an upholstery cover formed from a knitting process. The knitting process may be a three dimensional, lofted knitting process that gives the cover a degree of elasticity, such that the cover does not impede the support frame and suspension mesh from providing a desired support profile. In one embodiment, the fabric cover may encapsulate at least a portion of the suspension mesh and back support frame. In another embodiment, the fabric cover may extend over the surface of the suspension mesh facing the user. The cover may also wrap around the periphery of the suspension mesh and at least a portion of the rear surface of the support frame. In a more particular embodiment, the cover may wrap around the rear surface of the support frame leaving the central opening between the support posts exposed, with a portion of the cover extending into a spline channel in the frame adjacent the support posts to attach the cover to the back support in a fastenerless manner. For example, an extrusion may be disposed within the upholstery cover edging. The edging, including the extrusion, is inserted into the spline channel of the support frame such that the upholstery cover can be mounted to the back support without additional fasteners or adhesive.

In another embodiment, the support characteristics of the back support may be tuned to a desired profile by varying the features of the back support frame, such as the number, length, thickness, and the initial position of the support arms. For example, longer or narrower support arms, or more spaced apart support arms, may provide a greater degree of flexibility. In addition, in an embodiment where the suspension mesh is supported in tension between the peripheral edges of the support arms, the initial position of the support arms (i.e., prior to the attachment of the suspension mesh) may be set to a predetermined degree that requires an amount of flexing of the support arms in order to attach and retain the suspension mesh, wherein the support arms have a desired degree of flexed tension when supporting the mesh. A greater degree of movement from the pre-tensioned to the tensioned positions of the support arms increases tension in the support arms, making them feel tighter and more supportive to a user and altering the reactionary force noted above. The flexed state of the support arms may further help to retain the suspension mesh on the support frame.

In another embodiment, the back support defines thoracic, shoulder, lumbar, and pelvic regions, and the support characteristics provided by the combined back support frame and suspension mesh may be different in the different regions. For example, the support characteristics of the support arms of the back support frame and the width, thickness and spacing of the horizontal and vertical support members of the suspension mesh may be varied at different locations of the back support to create areas of increased support and areas of increased compliance depending on the desired functionality.

In another embodiment, the back support includes a lumbar mechanism positioned adjacent the rear side of a flexible back support surface, such as the rear side of the suspension mesh. The lumbar mechanism includes a resilient lumbar pad or cushion that has a portion in contact with the rear side of the flexible back support in at least the lumbar region. The resilient lumbar pad is adjustable along the vertical extent of the rear side of the flexible back support surface by rolling the flexible lumbar pad on the rear side of the flexible back support surface. In one embodiment, the resilient lumbar pad is a hollow, cylindrical cushion or pillow that can roll along the rear side of the flexible back support surface.

In another embodiment, the lumbar mechanism is positioned on a back support that includes a support frame with a pair of spaced apart upright support posts, and a flexible back support surface connected to the support frame. The lumbar mechanism is positioned between the back frame and the flexible back support surface and includes a lumbar pad, at least a portion of which engages the flexible back support surface. The lumbar pad is visible through the window defined between the support posts on the back frame. A handle may connect to the lumbar pad and extend through the window for access by the user.

In another embodiment, the lumbar mechanism includes a pair of spaced tracks mounted to upright support posts of a back support frame; and a carriage that is attached to the lumbar pad. The carriage is vertically moveable along the spaced tracks to adjust the vertical position of at least a portion of the lumbar pad. Further, the carriage may include a handle and a pair of opposed lateral portions, and the track may include a series of detents. The lateral portions of the carriage are configured to mount the carriage to the tracks and to interface with the detents such that the vertical position of the lumbar pad can be retained at a desired position.

According to another embodiment, a method of manufacturing and assembling the back support is provided. The method generally includes: (a) molding the back support frame; (b) molding the suspension mesh; and (c) mounting the back support frame to the suspension mesh. In one embodiment, the method further includes mounting the lumbar mechanism within the space between the back support frame and the suspension mesh.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or may be carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 is a rear view of a back support frame of the back support of FIG. 1;

FIG. 5 is a front view of the back support frame;

FIG. 6 is a side view of the back support frame;

FIG. 28 is a rear view of the back support, illustrating the lumbar support in a lowered position;

FIG. 29 is a rear view of the back support, illustrating the lumbar support in a mid or home position;

FIG. 30 is a rear view of the back support, illustrating the lumbar support in a raised position;

DETAILED DESCRIPTION OF THE CURRENT EMBODIMENT

I. Overview

Figure 1:
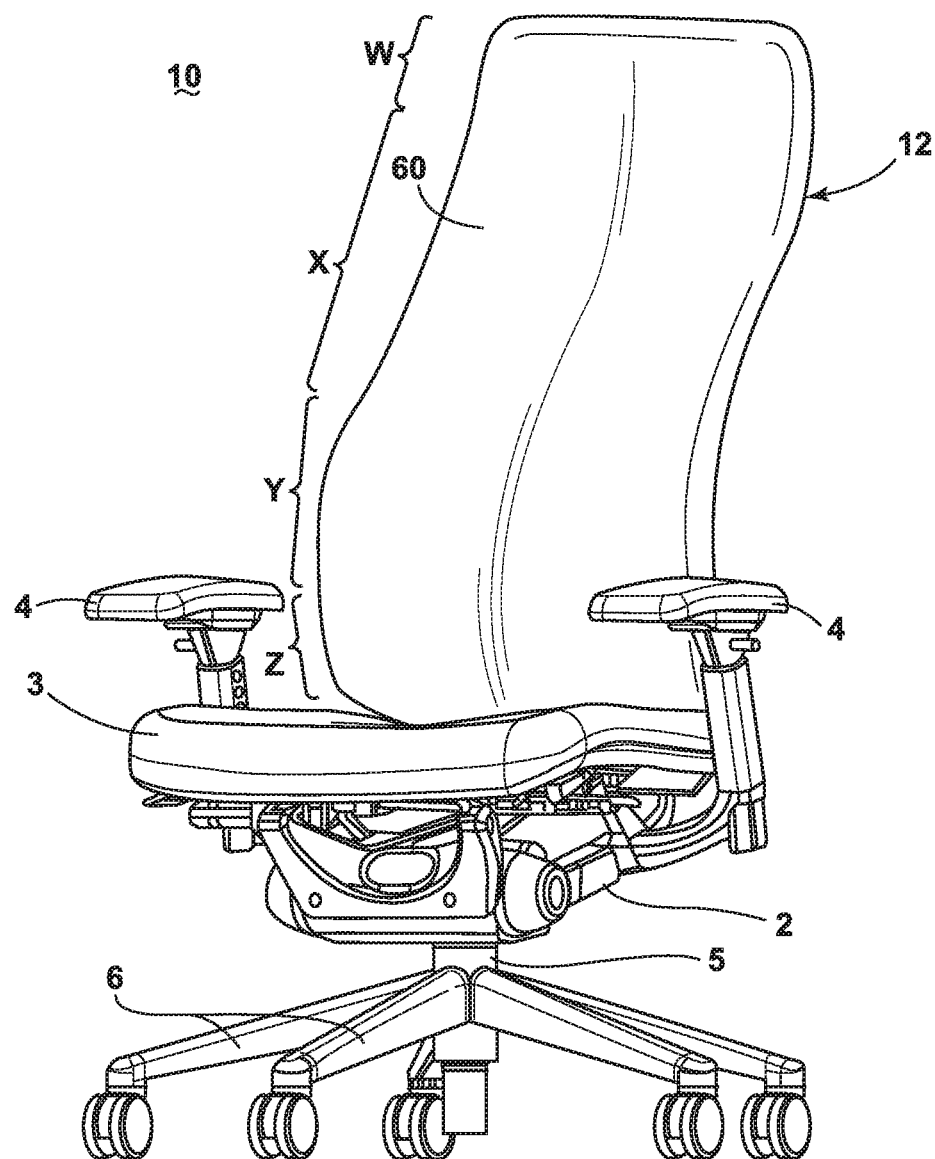
FIG. 1 is a perspective view of an office chair having a back support according to one embodiment of the present invention.
Figure 3:
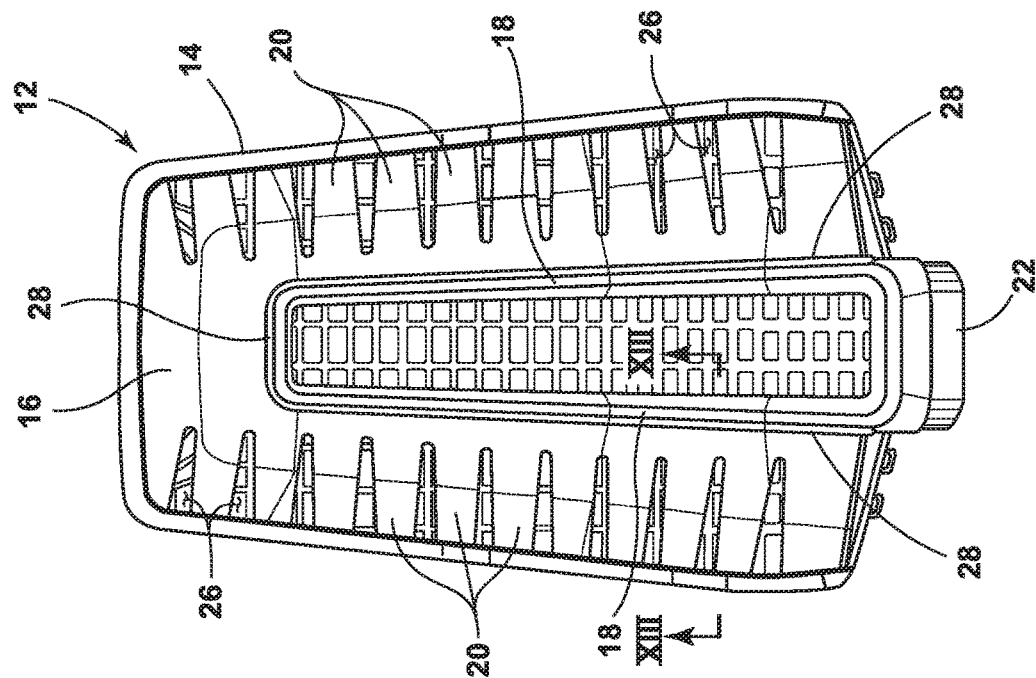
FIG. 3 is a rear perspective view of the back support, with the upholstery cover removed.
Figure 2:
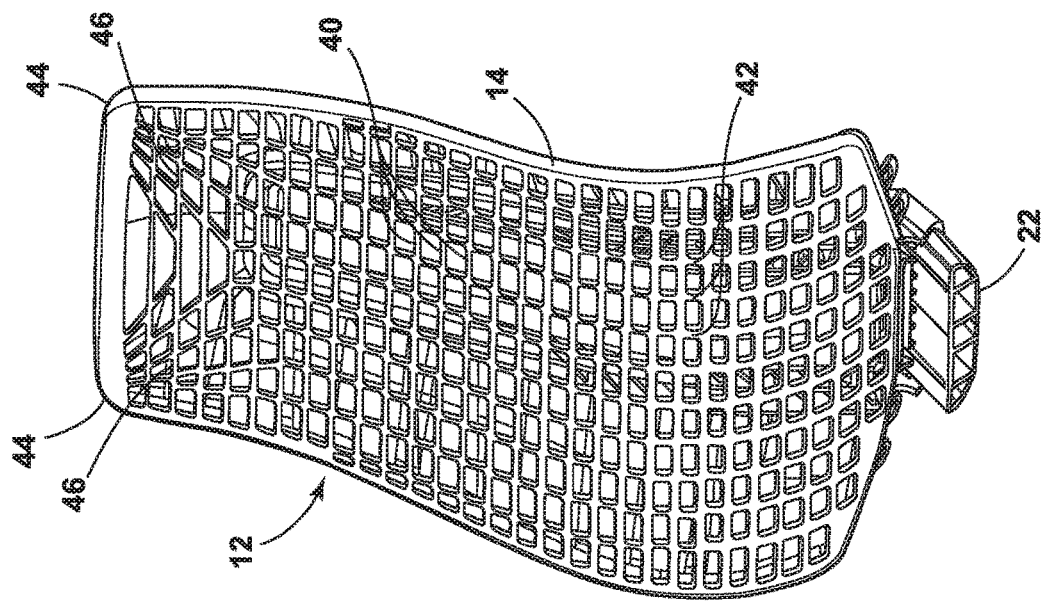
FIG. 2 is a front perspective view of the back support, with an upholstery cover removed.

An office-type chair 10 is shown in FIG. 1 and generally includes a back support 12 constructed in accordance with an embodiment of the present invention. Although FIG. 1 illustrates the back support 12 as part of a complete chair 10 with a seat support 3 and other support structure, this is only exemplary. The back support 12 may be generally used in connection with any structure intended to provide seated back support. In particular, the embodiments of the office chair 10 disclosed in the present application include the back support 12 for comfortably supporting the back of a user and an efficient method of manufacturing and assembling such a back support.

FIG. 1 shows a view of an exemplary version of the chair 10. The office chair 10 generally includes a chair frame 2, a seat support 3, and optional armrest assemblies 4 extending from the chair frame 2. The seat support 3 defines an upward facing support surface on which the occupant is supported. The chair frame 2 may include a height adjustable base 5 having plurality of outwardly extending legs 6 to which casters 7 are pivotally mounted. Further, the chair 10 may include a tilt control mechanism.

The back support 12 of the present invention defines thoracic X (including shoulder W), lumbar Y, and pelvic regions Z as illustrated in FIG. 1. The support characteristics provided by the back support 12 may be different in the different regions W-Z. The lumbar and pelvic regions Y, Z provide the greatest support, while the thoracic region X provides the least support. The shoulder region W (a subset of the thoracic region X) provides high flexibility and low pressure, specifically against the occupant's shoulders. Likewise, the rest of the thoracic region X is also configured to provide high compliance and low pressure, while bridging the support characteristics between the shoulder and lumbar regions. The lumbar region Y has a natural support curve, which aids in comfort and proper posture for a seated occupant. Lastly, the pelvic region Z offers the most support and the least flexibility, and helps rotate the occupant's pelvis forward in order to assist maintaining lordosis in the lumbar spine which helps balance the muscle load and reduces loading on the intervertebral ligaments and discs as well as reducing pressure on the sacrum/coccyx when an occupant is sitting.

II. Structure

Referring to FIGS. 2-6, the back support 12 has a contoured shape that promotes proper posture the back of an occupant. The back support 12 comprises a suspended or suspension mesh back support 14, referred to herein as "suspension mesh," and a back support frame 16. As shown in FIGS. 4-6, the support frame 16 includes a central pair of generally upright support posts 18 and a plurality of flexible and spaced support arms 20 extending laterally outward from the support posts 18. In the illustrated embodiment, the support frame 16 also includes a lower wedge base 22 for mounting the back support 12 to the chair frame 2. As illustrated, the upright support posts 18 are joined at an upper end by a support cross member 21 and at the lower end by an upper portion of the lower wedge base 22 (which also forms a support cross member), which collectively define an internal central opening 23 or "window" therebetween. In one embodiment, the support posts 18 and cross members 21, 22 may be provided with a predetermined degree of flexibility. The back support 12 may have a contoured shape that helps promote proper posture for the occupant. In particular, as seen in FIG. 6, the lower portion of the mesh 14, when suspended by the support frame 16, is generally convex and the upper portion curves forwardly and is generally concave such that the back support 12 approximates the neutral posture axis of the occupant's spine.

The support frame 16 may be formed from a variety of materials, such as an injection molded plastic; and the support posts 18 and the support arms 20 may be formed integrally from a single piece of molded plastic. In one embodiment, the entire support frame 16 is molded as a unitary piece, with portions of the support frame 16 molded to predetermined dimensions that will provide the overall back support 12 with a desired support profile when the support frame 16 is combined with the suspension mesh 14 as defined in more detail below. The support posts 18 provide support for the back support 12, but may also provide a degree of torsional flexibility for the back support 12. For example, the support posts 18 may have a controlled degree of torsional deflection and resiliency such that they are capable of twisting about an axis (defined by the longitudinal length of the support post 18) under the force of an occupant's back on the support arms 20, which enables the back support 12 to move with the occupant as the occupant shifts from side to side, leans, or twists. More particularly, in an embodiment where the frame includes a pair of spaced apart support posts 18 and the support arms 20 extend outwardly from each of the support posts 18, a portion of each individual support post 18, between the upper 28 and lower 22 cross members, may have a degree of independent torsional flexibility such that the portion of each support post may independently twist about the axis as a user leans against and flexes one or more of the support arms 20 that extend outwardly from that particular support post 18. This two-point flexing (each support post 18 twisting about its own longitudinal axis in an opposite direction from the other support post 18) may be advantageous in that it moves the neutral deflection axis between the two support posts 18 closer to the occupant's spine, whereas a single support arm and flex point would cause the occupant to rotate about the back, rather than with it.

The support arms 20 each have a peripheral edge 24 and may extend generally parallel to one another. In the illustrated embodiment, the support arms 20 include a width extending in a generally vertical direction, and the width tapers as the support arms 20 approach the peripheral edge 24. The support arms 20 are spaced from one another and include a gap 26 between adjacent arms 20. In the illustrated embodiment where the width of the support arms 20 tapers, the spacing between support arms increases approaching the peripheral edges 24. In the illustrated embodiment, the gaps 26 between adjacent arms do not extend entirely to the support posts 18, which may slightly increase the strength of the support arms 20 near the support posts 18. Alternatively, the gaps 26 may extend completely to the support posts 18. In an alternative embodiment, the arms may slightly converge or diverge as they approach the peripheral edge 24.

Further, the support arms 20 are molded to have a slight first position "A" in an initial state prior to attachment to the suspension mesh 14, as will be described in more detail below. As shown in FIGS. 4-6 and 12-13, in the first position A, referred to as the pre-tensioned state, the support arms 20 are angled slightly rearward, toward the rear of the office chair 10, such that they can then be flexed to a more forward and tensioned position—as described in more detail below—when connected to the suspension mesh 14. The support characteristics provided by the support frame 16 are based, at least in part, on the length, thickness, number and the pre-tensioned position or curvature of the support arms 20. The size of the gap 26 between adjacent arms 20 also influences the support characteristics provided by the support frame 16. In another embodiment, the back support 12 may be formed without the plurality of support arms, for example, by forming a single, unitary flexible portion that may be curved as desired in a pre-tensioned state.

Figure 9:
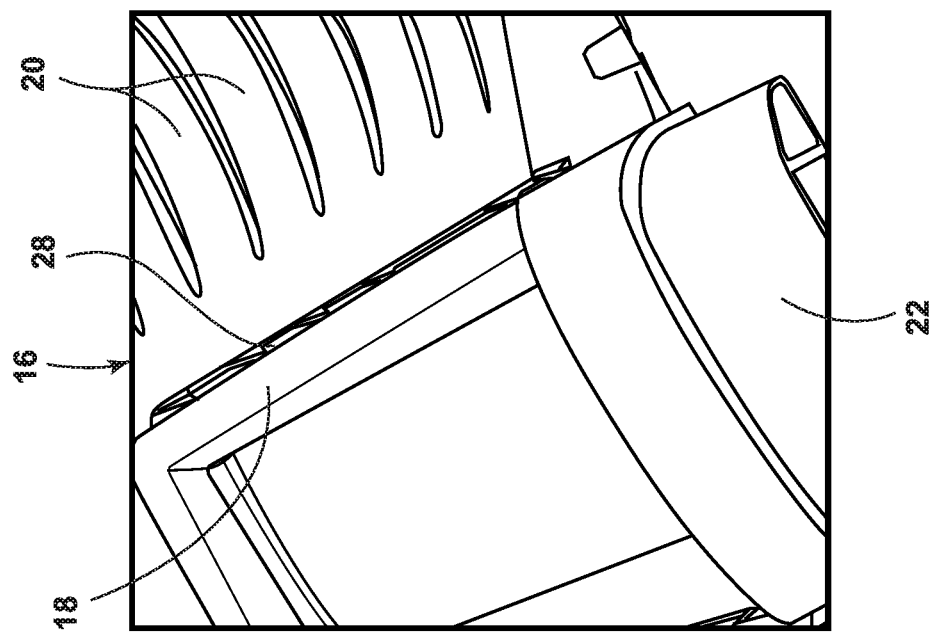
FIG. 9 is a detail view of a rear portion of the back support frame, taken from FIG. 4 and illustrating a spline channel.

Referring additionally to the detail view of FIG. 9, the support frame 16 includes a spline channel 28. The spline channel 28 is generally a groove that extends along the length of each of the support posts 18 adjacent to each of the support posts on a rear surface of the support frame 16. The spline channel 28 also extends between the upper ends of the support posts 18, along the cross member 21, at an upper end of the support frame 16. In the illustrated embodiment, the spline channel 28 is a continuous channel, however, in another embodiment the spline channel may be a series of intermittent channels. As discussed in more detail below, the spline channel 28 provides an attachment structure for the cover 60 extending over the support frame 16 and suspension mesh 14.

As illustrated, the wedge base 22 is one option for attaching the support frame 16 to the base 5. As seen in FIGS. 4-6, the wedge base 22 protrudes from a lower portion of the support frame 16 and is configured to be received in a rigid portion of the base 5. In this embodiment, the wedge base 22 and base 5 have mutually complementing shapes, and the wedge base 22 is fitted into the base 5 in a generally male/female type connection. Although not shown, a fastener may be installed from a lower surface of the base, through the base 5, and into the wedge base 22, connecting the components primarily in tension. Of course, in an alternative embodiment, the back support 12 may connect to the base 5 by another method.

Figure 8:
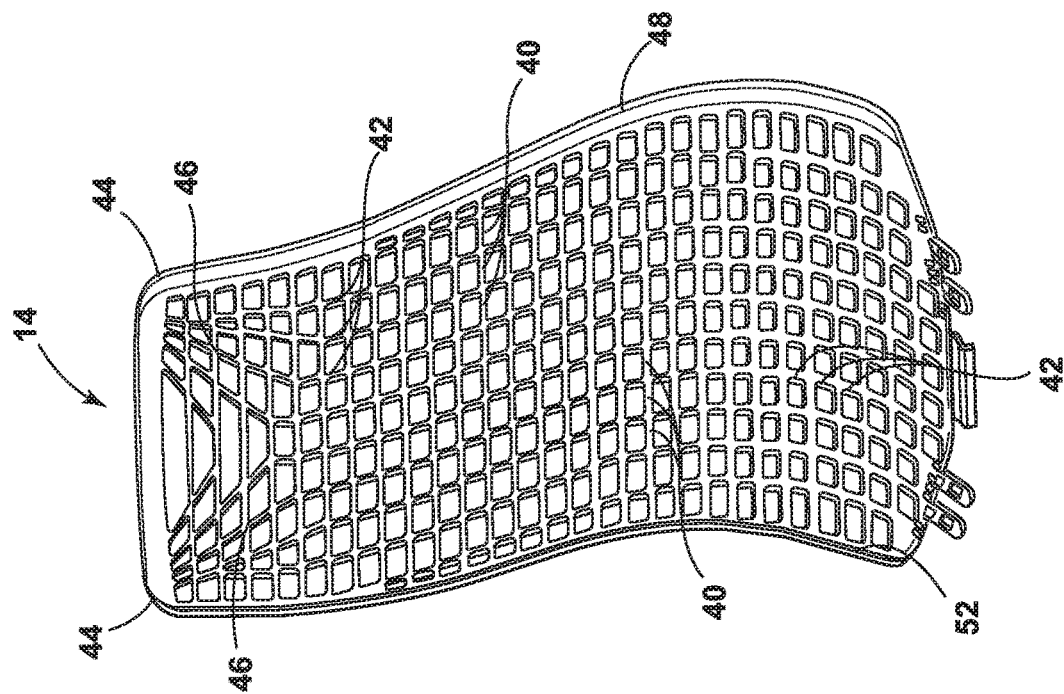
FIG. 8 is a rear view of the suspension mesh back support.
Figure 7:
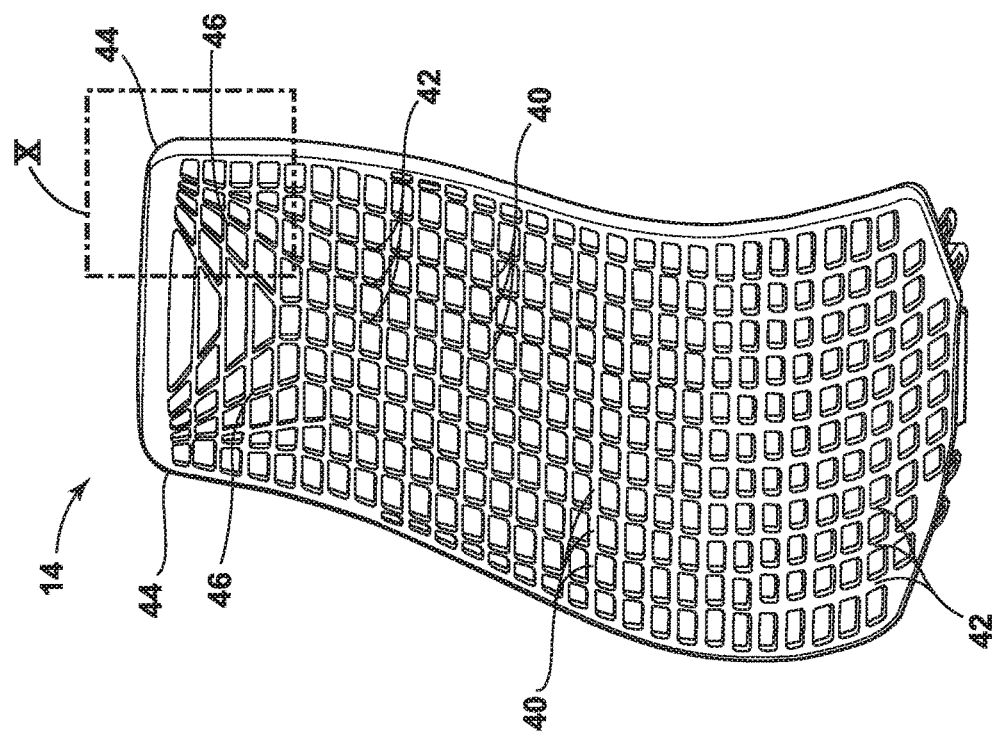
FIG. 7 is a front view of a suspension mesh back support of the back support of FIG. 1.

As noted above, the suspension mesh 14 may be a one-piece, molded performance material that is suspended in a degree of tension on the support frame 16 to extend in front of the front surface of the support frame 16. The suspension mesh 14 may be arranged in such a manner that, when supported on the support frame 16 via the tensioned support arms 20, it provides desired support characteristics to accommodate a wide variety of user types. In one embodiment, the suspension mesh 14 is molded or otherwise formed from a flexible material, which may be a flexible polymer such as a thermoplastic elastomer, and, in a more particular embodiment, may be a thermoplastic polyurethane or a thermoplastic polyester. Referring now to FIGS. 7-8, the suspension mesh provides a load bearing surface that supports the back of the occupant. In the illustrated embodiment, the suspension mesh 14 includes spaced horizontal tensioning support members 40 and spaced vertical tensioning support members 42 that together form a flexible mesh to distribute the load applied by the user. The horizontal support members 40 are generally uniformly spaced apart from one another across the vertical extent of the suspension mesh 14, and each horizontal support member 40 has approximately the same width extending in a vertical direction. In one embodiment, the horizontal support members 40 may be thicker in the lumbar region and in the pelvic region to provide a degree of additional support in those regions. The vertical support members 42 are generally uniformly spaced from one another across the lateral extent of the suspension mesh 14, and in the illustrated embodiment the vertical support members 42 gradually increase in thickness in a lateral direction from the upper end of the suspension mesh 14 toward the lower end of the suspension mesh 14, such that the vertical support members 42 are thicker within the lumbar and pelvic regions of the suspension mesh 14 to provide a degree of additional support in the lumbar region. Further, the suspension mesh 14 may include two shoulder supports 44 formed by spaced radial arrays 46 that are disposed at the upper corners of the suspension mesh 14. The radial arrays 46 are diagonal bands that are relatively thin and widely spaced, the purpose of which will be discussed below. The support characteristics provided by the suspension mesh 14, both as an overall arrangement and in the variations between different regions, are based, at least in part, on the thickness and spacing of the horizontal and vertical tensioning support members 40, 42 and the radial arrays 46. As noted above, the arrangement shown in the illustrated embodiment is tuned to provide desired support characteristics in the desired locations for a wide variety of user types; however, the thickness, depth and spacing of the support members 40, 42 may be varied from application to application in order to provide the suspension mesh 14 with an alternative support profile. For example, in another embodiment, added support may be provided at other regions, for example, by increasing the thickness of the vertical 40 or horizontal support members 42 in that region, or by decreasing the spacing between horizontal support members 42 in that region or a combination of these features.

Referring still to FIGS. 7-8, the profile of the suspension mesh 14—when attached to the support frame 16—has a predetermined contour that supports a typical chair occupant in an appropriate posture, ergonomically supporting the back of the occupant. This contour is the result of the predetermined tuning of the back frame 16 and support arms 20 in the pre-tensioned state, such that when the support arms 20 are moved into a tensioned state with the attachment of the suspension mesh 14, each support arm 20 has a desired position and a desired amount of tension for the support arms 20 and mesh 14 to collectively form the desired contour. More particularly, the front surface of the suspension mesh 14 has a generally convex shape in the pelvic and lumbar regions to provide support to those regions of the user's back, whereas the upper portion of the front surface of the suspension mesh 14 (in the thoracic and shoulder regions) is generally concave. When loaded with the weight of an occupant, the back support 12 provides flexibility as noted above due to the individual flexibility of the support arms 20 and the compliance of the mesh 14, while continuing to encourage this ergonomic user posture.

Figure 10:
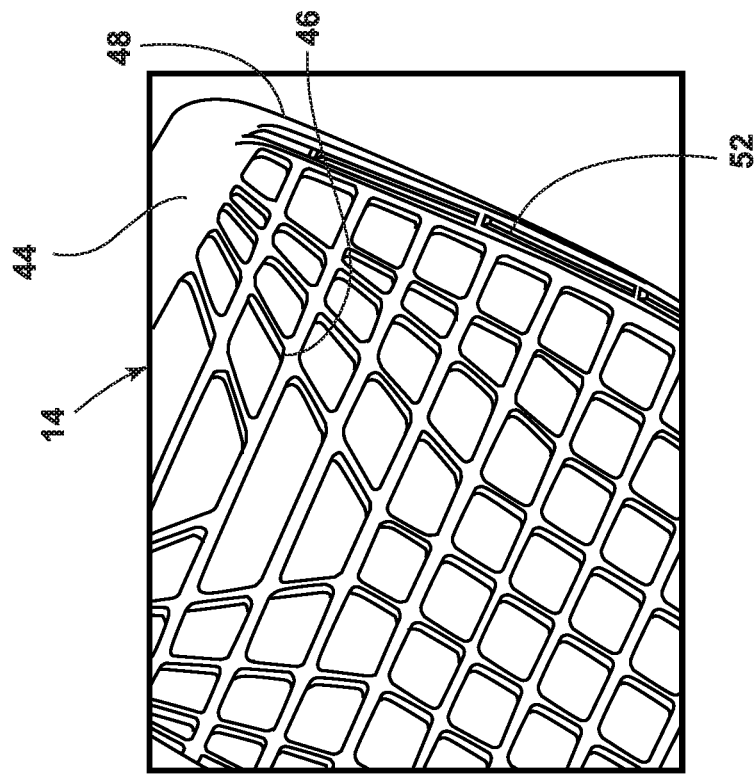
FIG. 10 is a detail view of a rear portion of the suspension mesh back support, taken from FIG. 7 and illustrating a retaining channel.

Referring to the detail view of FIG. 10, the suspension mesh 14 includes an integral retaining channel 48 disposed at a peripheral edge 50 of the suspension mesh 14. As noted below, the retaining channel receives the peripheral edges of the support arms 20 on the support frame 16 to attach the suspension mesh 14 to the support frame 16. The retaining channel 48 is configured such that an opening 52 is disposed on a rear surface of the suspension mesh 14 at a periphery of the suspension mesh 14 and the retaining channel 48 is open toward the center of the suspension mesh 14. The retaining channel 48 is molded to be rigid for mounting, yet flexible enough to allow a needed degree of localized flexing, as described in greater detail below. In the illustrated embodiment, the retaining channel is intersected by a series of spaced apart dividers 47 to provide the channel with a degree of support that prevents the channel from being pulled open. The dividers may be spaced apart at a distance greater than the width of the peripheral edges of the support arms 20, such that the support arms 20 are not overly constrained within the receiving channel 48 and each individual support arm 20 is enabled a degree of twisting and sliding movement within the channel 48. As noted, the suspension mesh 14 may be formed from a variety of materials; and the horizontal and vertical tensioning support members 40, 42, radial arrays 46, and retaining channel 48 are integrally formed as a single component.

Figure 12:
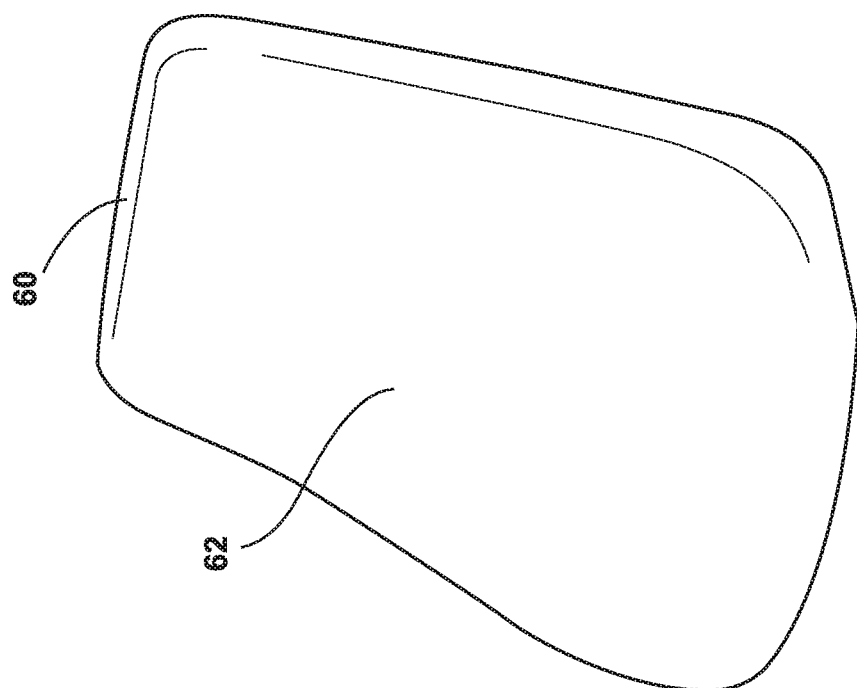
FIG. 12 is a front view of the upholstery cover.
Figure 11:
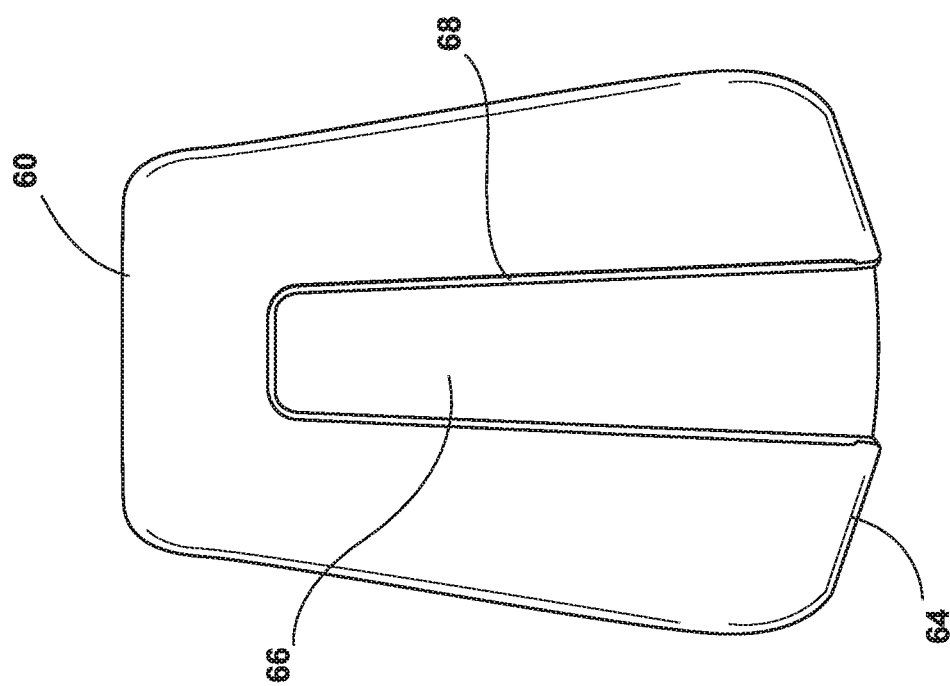
FIG. 11 is a rear view of the upholstery cover.

Referring now to FIGS. 11-12, front and rear views of an upholstery cover 60 are illustrated. In one embodiment, the upholstery cover 60 covers at least a portion of the support frame 16 and suspension mesh 14, defining a suspension surface 62 against which the back of a seated occupant is supported. In one embodiment, the upholstery cover 60 is in the form of a substantially contoured pocket with an open lower end 64 and is sized and shaped to fit snugly about the periphery of the suspension mesh 14 as the suspension mesh 14 is suspended on the support frame 16. In the illustrated embodiment, the upholstery cover 60 includes a central opening 66 extending upwardly from the opening 64 at the lower end along the rear surface of the cover 60 and aligned with the window 23 in the support frame 16. The central opening 66 may include a pocket-type edging 68 formed in the perimeter of the central opening 66, and an elongated extrusion 70 (not shown) disposed within the edging 68. The central opening 66 and edging 68 are configured to substantially match the shape of the support frame 16 spline channel 28—extending around the window 23 in the support frame 16—for mounting the upholstery cover 60 to the back support 12, as will be described in full detail below.

The upholstery cover 60 can be made of a three-dimensional, lofted, spacer knit fabric that provides form fitting stretch qualities and as well as cushioning characteristics. In this embodiment, the lofted knit of the upholstery cover 60 provides a degree of stretch in the upholstery fabric 60 that enables some stretching of the cover as the frame 16 and suspension mesh 14 flex. In one embodiment, the upholstery cover 60 knit construction is somewhat visually translucent, yet is thicker than traditional knits or weaves. The knit fabric construction allows a level of stretch and recovery without elastomeric content such that the cover 60 does not prevent movement and flexing of the underlying suspension mesh 14 and frame 16. Further, the knitting process may enable the upholstery cover 60 to be knit in a pattern without having to use sewing or other fastening means.

To provide additional support to the occupant, the back support 12 optionally includes a lumbar support unit 80 which is configured to support the lumbar region of the occupant's back and is adjustable to improve and customize the comfort of this support. The lumbar support unit 80 is positioned between the suspension mesh 14 and the support frame 16. In one embodiment, the lumber support unit 80 is adjustable by rolling a resilient lumbar pad 82 along a portion of the rear surface of the suspension mesh 14.

Referring now to FIGS. 17-36, the lumbar support unit 80, also referred to as the lumbar mechanism 80, includes a resilient pillow or lumbar pad 82, a pair of spaced tracks 84, and a carriage 86 mounted between the tracks 84. In one embodiment, the lumbar pad 82 is a flexible cushion that is compressed between the suspension mesh 14 and the back support frame 16 and capable of conforming when experiencing a load from the occupant. More particularly, the lumbar pad 82 is a hollow, tubular cushion that is a cylindrical body 88 having opposing open ends 90 when in an uncompressed state. The pad 82 may be deformed out of the cylindrical shape when positioned between the suspension mesh 14 and the support frame 16. In one embodiment, the lumbar pad 82 may be made of a soft, translucent plastic material.

As illustrated, the lumbar pad 82 includes plurality of annular support ribs 92 that are integrally molded in the cylindrical body 88 and are configured to provide a desired degree support to the lumbar mechanism 80. The support ribs 92 extend around the circumference of the body 88 and are spaced from one another. More or fewer support ribs 92 may be molded into the body 88 than are shown in the illustrations, and the spacing between the support ribs 92 may also be adjusted to modify the support characteristics of the lumbar pad 82. In the illustrated embodiment, the number and spacing of the support ribs 92 is predetermined to provide the pad 82 with a desired deflected profile when the pad 82 is deformed between the suspension mesh 14 and the frame 16 and further deformed when experiencing a load from a user. The illustrated pad 82 includes two groups of support ribs 92. A first group 93 of three support ribs 92 is positioned adjacent one end of the pad 82, with a first one of the ribs 92 in the group 93 spaced from the end of the pad, and two additional ribs 92 in the group 93 positioned inward from the first rib such that each rib 92 in the group 93 is spaced from an adjacent rib 92 in the group 93 at the same distance. The group of ribs 95 is disposed at the opposite end of the pad 82 with similar spacing. The groups 93 and 95 are spaced from one another leaving a central portion 97 in between the two groups of ribs with no ribs. This arrangement may provide a greater amount of support within the groups 93, 95 than in the central portion 97 while overall the pad 82 remains compliant.

The tracks 84 are affixed to the support frame 16. More specifically, the tracks 84 are mounted to a forward surface of the upright support posts 18, between the support frame 16 and the suspension mesh 14. The tracks 84 each include a series of vertically spaced elongated detents 94 in the form of recesses, holes, or dents. The tracks 84 have a contoured shape to match that of the upright support posts 18 and the support frame 16.

In the illustrated embodiment, the tracks 84 are affixed to the upright support posts 18 with shoulder screws 95 that extend through oversized mounting holes 96 through the track 84. As shown, for example, in FIGS. 26 and 27, the shoulder screws 95 may be inserted through oversized mounting holes 96 so as not to impede the flexibility of the back support 12 and to enable the track 84 to pivot slightly with respect to the frame 16. This connection may ensure that the tracks 84 stay parallel to one another as the frame 16 is flexed by the user and prevent binding of the carriage 86 that is mounted between the tracks 84. Of course, other means of attaching the tracks 84 to the upright support posts 18 are contemplated, including snaps and other fasteners.

The carriage 86 attaches to the lumbar pad 82 to enable adjustment of the pad 82. As shown, the carriage 86 includes a handle 98 and a pair of opposed lateral portions 100. The handle 98 is generally centered between the upright support posts 18 and is designed to be both aesthetically pleasing and functional. The handle includes a central fingertip portion 102 that extends rearward through the window 23 such that it is accessible by a user to adjust the position of the lumbar pad 82. As such, at least a portion of the lumbar pad 82 is visible (from the rear of the office chair 10) within the window 23.

The carriage 86 is configured to be vertically moveable along the spaced tracks 84 to adjust the vertical position of at least a portion of the lumbar pad 82. The lateral portions 100 of the carriage 86 are configured to mount the carriage 86 to the tracks 84. The lateral portions 100 are substantially mirror-image of one another and each has an upper arm 104 and a lower arm 106. In one embodiment, the upper 104 and lower 106 arms are spaced a sufficient distance from one another to distribute the torque from the handle 98 as the handle 98 is adjusted by a user. A spring mechanism is mounted to and between the upper and lower arms 104, 106 and includes a detent spring 108 having two v-shaped legs 110 and a center tab 112. The center tab 112 is mounted to a post 114 integral to the lateral portion 110 and is affixed using a rivet, screw, or other suitable fastener. The center tab 112 also includes an offset nub 116 positioned to interface with the detent 94 of the track 84. The lateral portions 100 and detent spring 108 are spring loaded against the detents 94 with enough bias that the vertical position of the lumbar pad 82 can be retained at a desired position.

An irregularly shaped spring wire 118 slidably retains the carriage 86, and more specifically the lateral portions 100, to the tracks 84. The spring wire 118 includes spaced horizontal bars 122 and a vertical bar 124 extending therebetween. The upper and lower arms 104, 106 of the lateral portion 100 each include a retention tab 120 and the horizontal bars 122 are positioned under and retained by respective retention tabs 120. The vertical bar 124 is positioned under and retained by the post 114 formed in the lateral portion 100. The horizontal bars 122 loop around the distal edge of the track 84, helping to retain the lateral portion 100 (and thus the carriage 86) against the track 84. As, the spring wire 118 is held in position, the lateral portion 100 is able to slide laterally along the spring wire 118. That is to say, the retention tabs 120 and post 114 retain the lateral portion 100 between the spring wire 118 and the track 84 in the fore-aft direction, yet allow movement of the lateral portion 100 and carriage 86 in the side-to-side direction. As the carriage moves in the side-to-side direction, the v-shaped legs 110 on the spring mechanism 108 act on the spring wire 118 to bias the carriage 86 in a generally centered position.

The lumbar pad 82 is mounted to the carriage 86 with spaced fasteners or retention clips 130. These retention clips 130 extend through the upper arms 104 of the lateral portions 100 of the carriage 86. In the illustrated example, the retention clips are shown as "Christmas tree" type fasteners, though other fasteners may be suitable. The rear of the lumbar pad 82 includes two through holes (not shown) into which the retention clips 130 are inserted. In one embodiment, the lumbar pad 82 includes structure for fixing the lumbar pad 82 in place with respect to the suspension mesh 14. As shown, the front of the lumbar pad 82 includes a center tongue 134 that extends outwardly from the surface of the lumbar pad 82. The center tongue 134 is adapted to be received within an opening formed by the horizontal and vertical support members 40, 42 of the suspension mesh 14. More particularly, in the illustrated embodiment, the center tongue 134 is a rectangular protrusion extending from the surface of the lumbar pad 82, and the shape and size of the rectangle matches the shape and size of one of the rectangular openings in the suspension mesh 14 that is formed between adjacent horizontal 40 and vertical 42 support members. Together, the center tongue 134 and retention clips 130 mounted to the carriage 86 provide a "rolling" motion of the lumbar pad 82 when the vertical position of the carriage 86 is adjusted by a user manipulating the handle 98.

As described above, the two lateral portions 100 are substantially mirror-images of one another, and each lateral portion 100 is slidably mounted to the respective track 84, which is independently mounted to the support post 18. The v-shaped spring legs 110 of the detent spring 108 are positioned to contact the vertical bar 124 of the spring wire 118. In the case that the carriage 86 is shifted to the left (toward the center of the chair), in the view shown in FIG. 24, the detent spring 108 is also pulled to the left, forcing the legs 110 to spread apart or flatten and applying a force to bias the carriage 86 back to the right. In the opposite case, illustrated in FIG. 25, where the carriage 86 is shifted to the right (away from the center of the chair), the detent spring 108 is also moved to the right, allowing the legs 110 to relax and move closer together, reducing the applied force.

The lateral portions 100 work together such that when the carriage 86 is shifted in one direction, one detent spring 108 applies a force in the opposite direction, and the opposite detent spring 108 relaxes. This relationship enables the carriage 86, and more specifically the handle 98, to stay centered within the window 23 of the back support 12. Additionally, the detents 94 in the track 84 are elongated in the lateral direction, and as the detent spring 108 moves side-to-side, the nub 116 is able to move side-to-side within the detent 94 without losing retention.

The design of the lumbar support unit 80, and in particular the design of the spring wire 118 and v-shaped legs 110, keeps the handle 98 centered within the window 23 of the back support 12 while enabling a degree of lateral movement of the carriage 86 through a range of tolerances, angles, and locations. As a result, the lumbar mechanism 80 can "float" side to side to allow tolerance and production variability of the back support 12, and as the back support 12 and frame are twisted from side-to-side under the force of an occupant's back. As described above, the support posts 18 have a controlled degree of torsional deflection and resiliency, and the float provided to the lumbar mechanism 80, along with the degree of pivoting flexibility between the tracks 84 and the support posts 18, can prevent racking or binding between the carriage 86 and the tracks 84 when the back support 12 is torsionally deflected.

Additionally, the design and placement of the handle 98 provides substantially torque resistant movement of the carriage 86 along the tracks 84. More particularly, the handle 98 is vertically spaced from the point at which the carriage 86 is mounted to the tracks 84, as well as the point at which the lumbar pad 82 is mounted to the carriage 86. This vertical space can prevent torsional binding between the carriage 86 and the tracks 84 when the lumbar mechanism 80 is raised or lowered by the user. In the illustrated example, the handle 98 is positioned at the vertical midpoint between the upper 104 and lower 106 arms of the carriage 86 to reduce torque on the handle as noted above; however, it should be understood that the handle 98 could also be positioned at a different mounting point of the carriage 86.

Referring to FIGS. 28-36 three positions of the lumbar mechanism 80 are illustrated with the lumbar pad 84 in position between the suspension mesh 14 and the frame 16. Notably, the lumbar pad 84 is generally cylindrical prior to insertion between the suspension mesh 14 and the frame 16, but the flexible nature of the pad enables the pad 84 to deform when compressed between the suspension mesh 14 and the frame 16. The position shown in FIGS. 29, 32, and 35 defines a mid or home position. In the home position, the lumbar pad 82 is generally ovate and is positioned at a mid-level height along the tracks 84. To move the lumbar mechanism 80, a user grasps the handle 98 and moves it up or down, forcing the nubs 116 to incrementally skip to adjacent detents 94. As noted above, the lumbar pad 82 rolls with respect to the suspension mesh 14 when the vertical position of the lumbar mechanism 80 is adjusted by a user. The rear of the lumbar pad 82 is affixed to the carriage 86 and moves up or down with the carriage 86 and a portion of the front of the lumbar pad 82 stays in the position with respect to the suspension mesh 14 because the tongue 134 is retained by the suspension mesh 14, resulting in the rolling motion—similar to the motion of a tank tread, albeit with the tongue 134 fixed on the suspension mesh 14—of the lumbar pad 82.

More specifically, in a first position of the lumbar pad 84, a first portion 140 of the lumbar pad 82 engages and is compressed against a first portion 150 of the rear surface of the suspension mesh 14. Moving the handle 98 of the lumbar mechanism 80 causes the lumbar pad to roll such that an adjacent second portion 142 of the lumbar pad 82 rolls into contact with an adjacent second portion 152 of the rear surface of the suspension mesh 14. This provides continuous rolling engagement of at least a portion of the lumbar pad 82 on the rear surface of the mesh 14.

Figure 31:
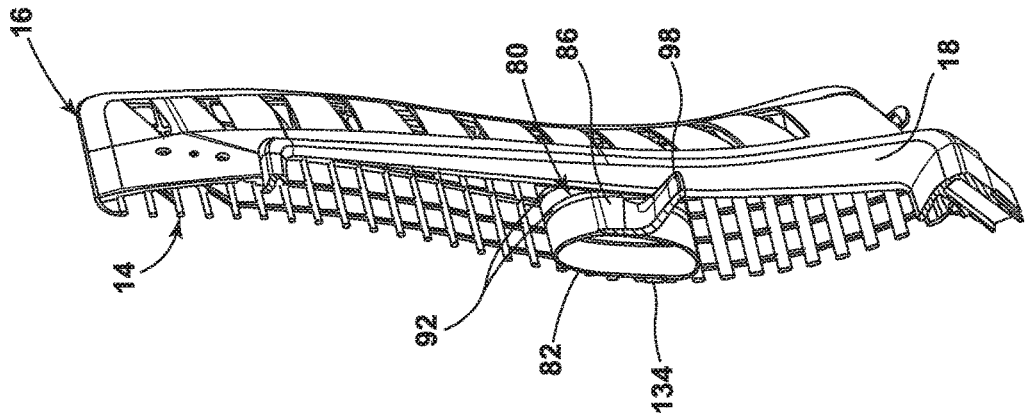
FIG. 31 is a perspective, cross-sectional view of the back support, taken along line XXXI-XXXI of FIG. 28 and illustrating the lumbar support in a lowered position.
Figure 32:
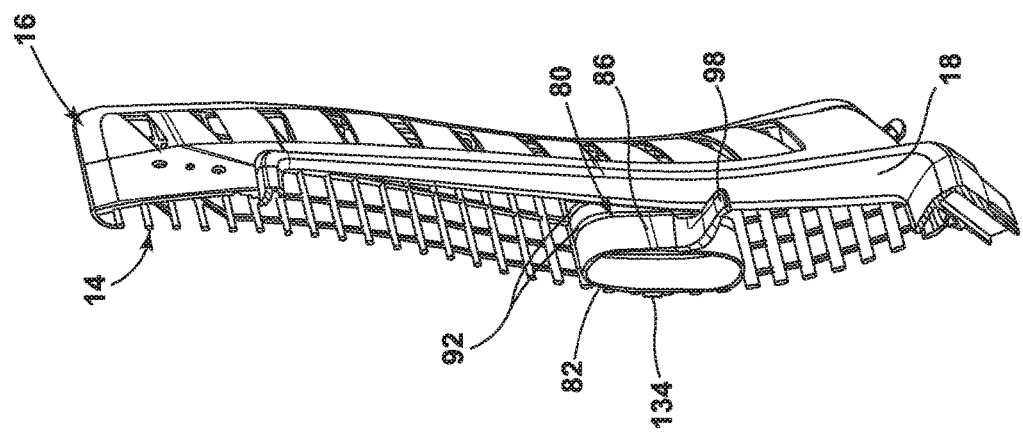
FIG. 32 is a perspective, cross-sectional view of the back support, taken along line XXXI-XXXI of FIG. 28 and illustrating the lumbar support in a mid or home position.
Figure 34:
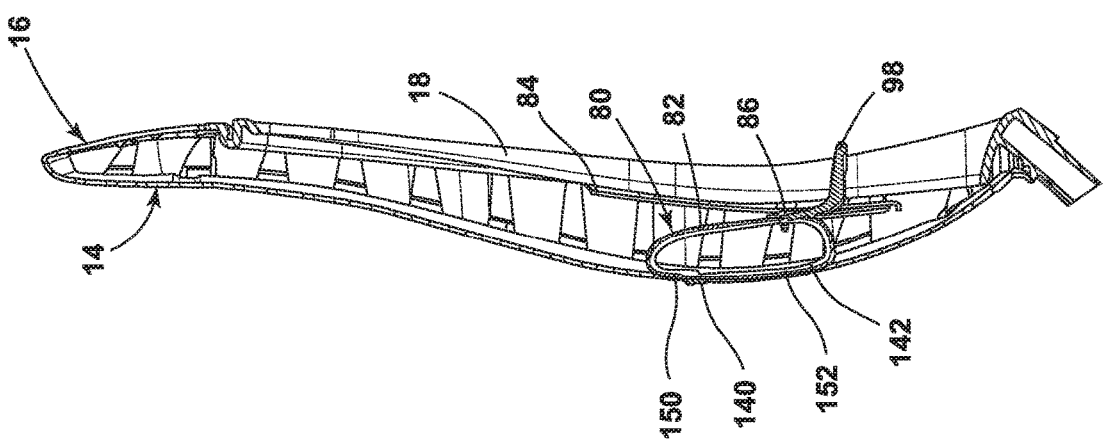
FIG. 34 is a cross-sectional view of the back support, taken along line XXXI-XXXI of FIG. 28 and illustrating the lumbar support in a lowered position.

The lumbar position illustrated in FIGS. 28, 31, and 34, defines a lowered position. The user pulls the handle 98 downward, forcing the nubs 116 to skip down to one of the lower detents 94. The rear of the lumbar pad 82 is pulled down, while the tongue 134 portion of the lumbar pad 82 remains in place. This rolls the lumbar pad 82 down in the manner of a tank tread, providing lumbar support to a lower region of the back support 12. In this lowered position, the first portion 140 and the second portion 142 engage the first and second portions 150, 152 of the suspension mesh 14.

Figure 33:
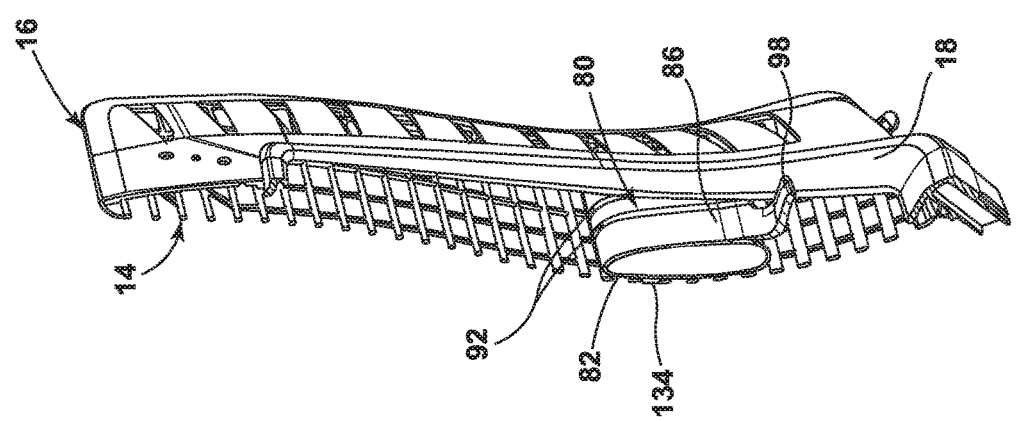
FIG. 33 is a perspective, cross-sectional view of the back support, taken along line XXXI-XXXI of FIG. 28 and illustrating the lumbar support in a raised position.
Figure 36:
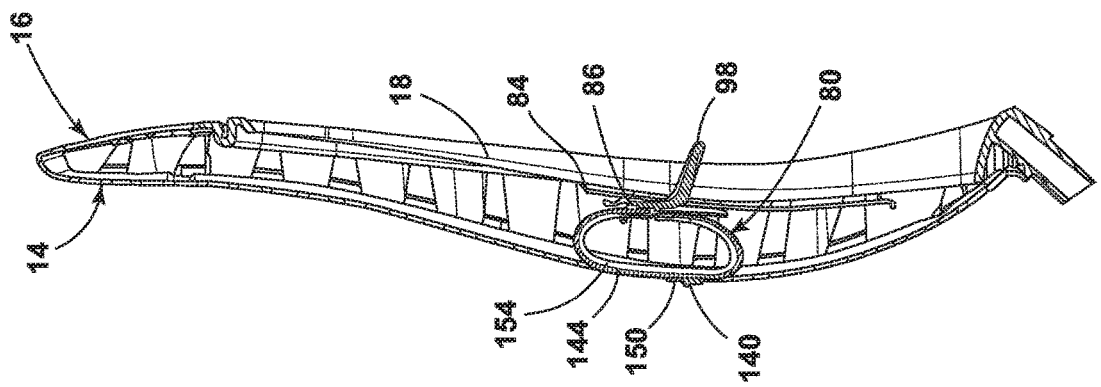
FIG. 36 is a cross-sectional view of the back support, taken along line XXXI-XXXI of FIG. 28 and illustrating the lumbar support in a raised position.
Figure 35:
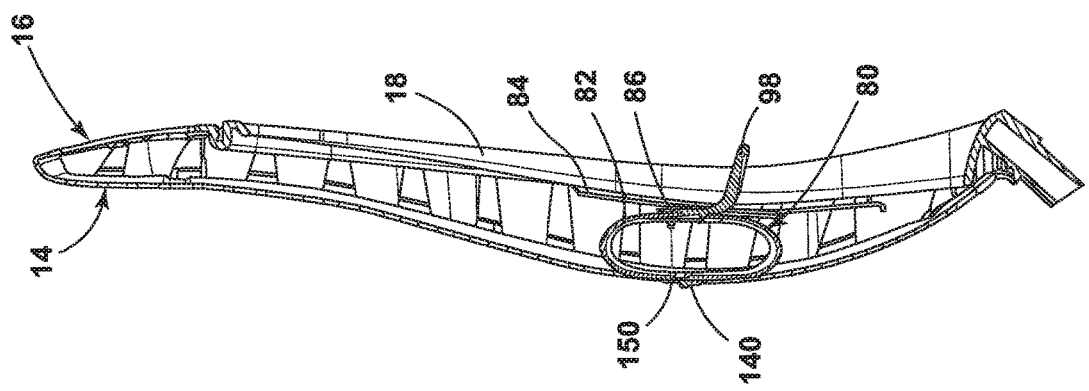
FIG. 35 is a cross-sectional view of the back support, taken along line XXXI-XXXI of FIG. 28 and illustrating the lumbar support in a mid or home position.

The lumbar position illustrated in FIGS. 30, 33, and 36, defines a raised position. The user pulls the handle 98 upward, forcing the nubs 116 to skip up to one of the higher detents 94. The rear of the lumbar pad 82 is pulled up, while the tongue 134 portion of the lumbar pad 82 remains in place. This rolls the lumbar pad 82 upward, providing lumbar support to a higher region of the back support 12. In this raised position, the first portion 140 and a third portion 144 engage the first portion 150 and a third portion 154 of the suspension mesh 14.

It should be understood that intermediate lumbar mechanism 80 positions are possible as the lumbar pad 84 is rolled up and down the rear surface of the mesh 14, and are not limited to the three illustrated. In an alternative embodiment, the lumbar mechanism 80 may be used in connection with any flexible back support surface to provide continuous adjustable support along any desired region of the back support surface. The lumbar mechanism 80 may be positioned with the nubs 116 seated in any of the detents 94. In another embodiment, the lumbar mechanism 80 may roll without the use of specific detents.

III. Manufacture

Figure 16:
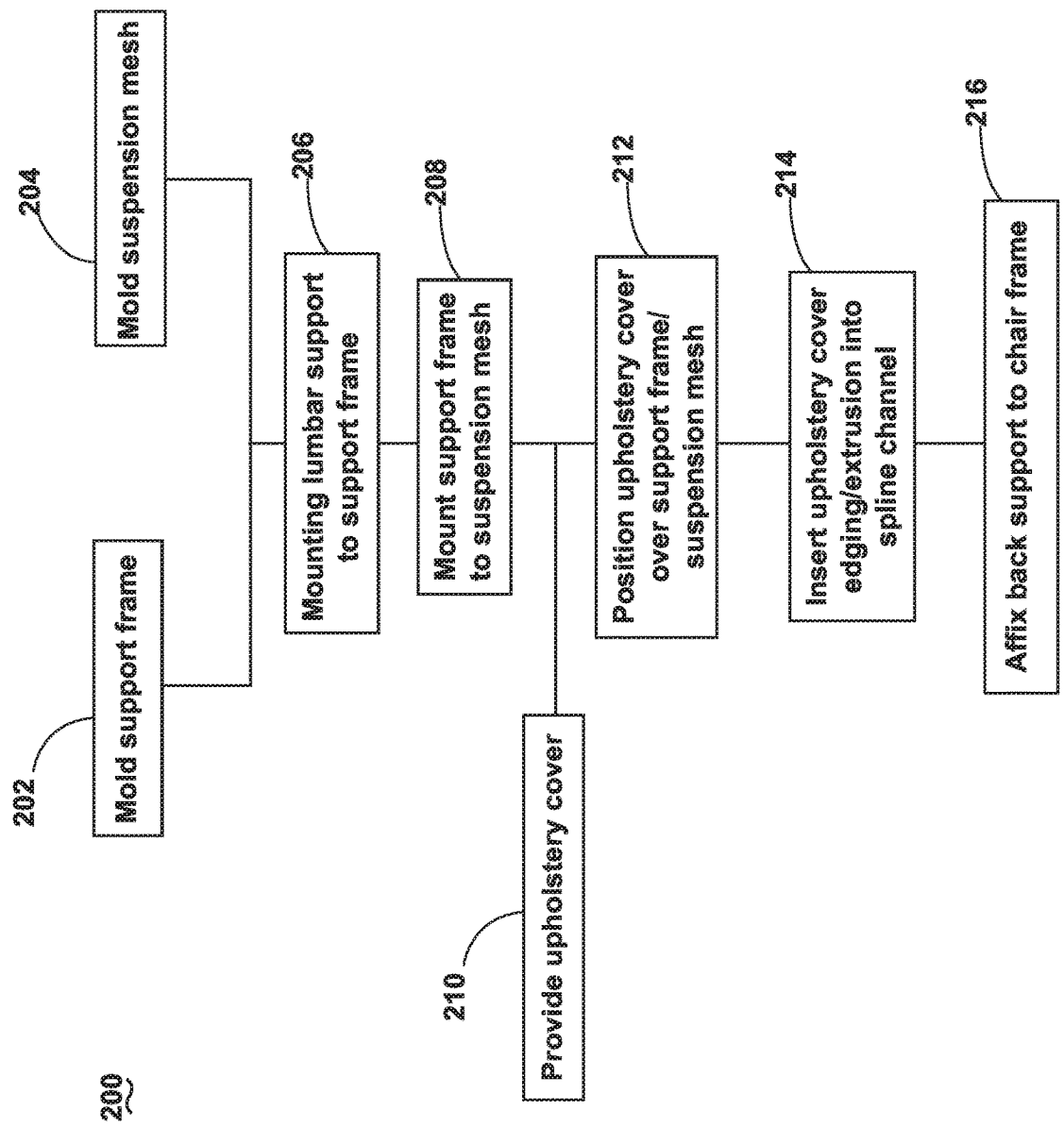
FIG. 16 is a flow chart depicting a method of manufacturing the back support.
Figure 17:
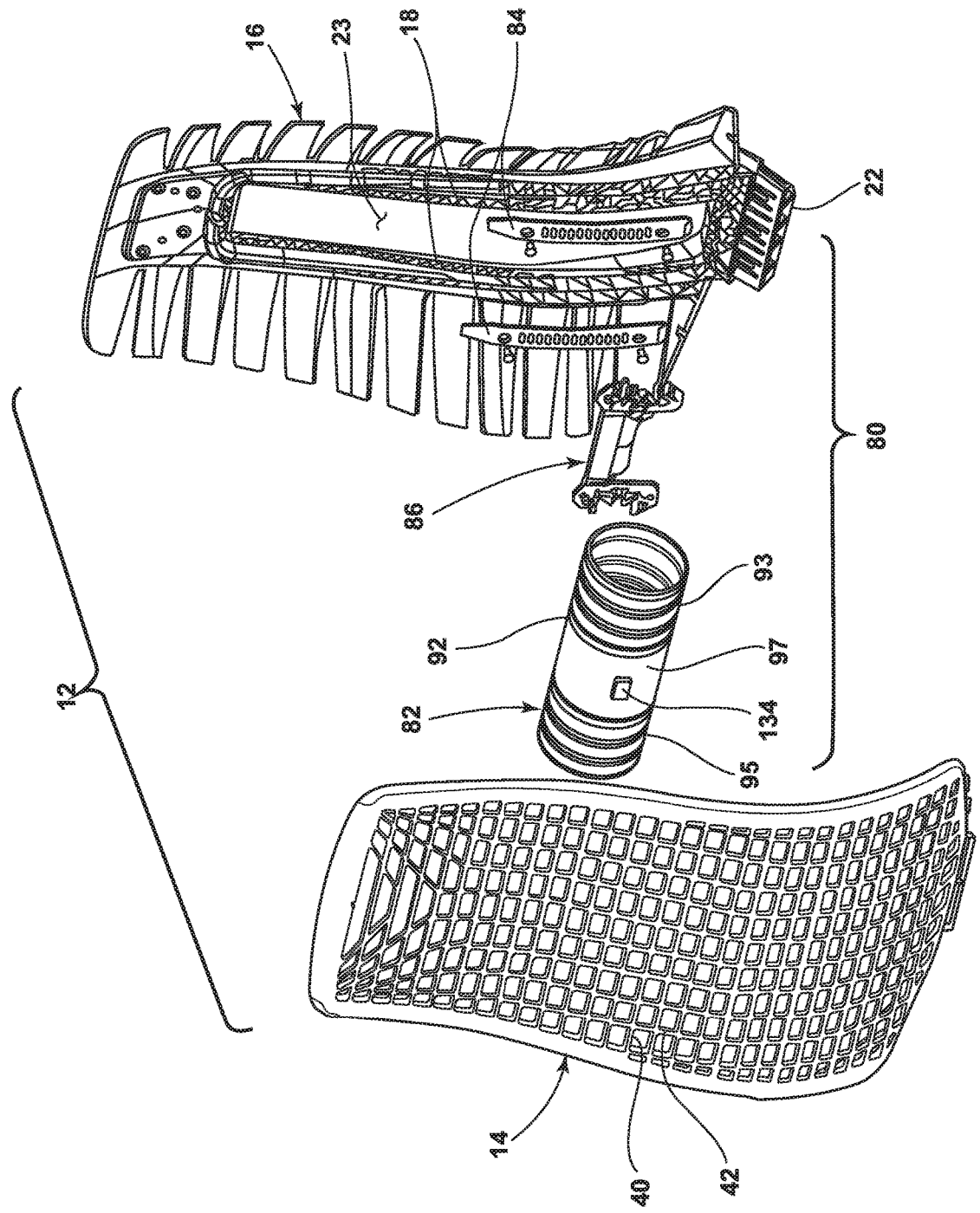
FIG. 17 is and exploded view of the back support, including a lumbar support unit, according to another embodiment of the present invention.
Figure 18:
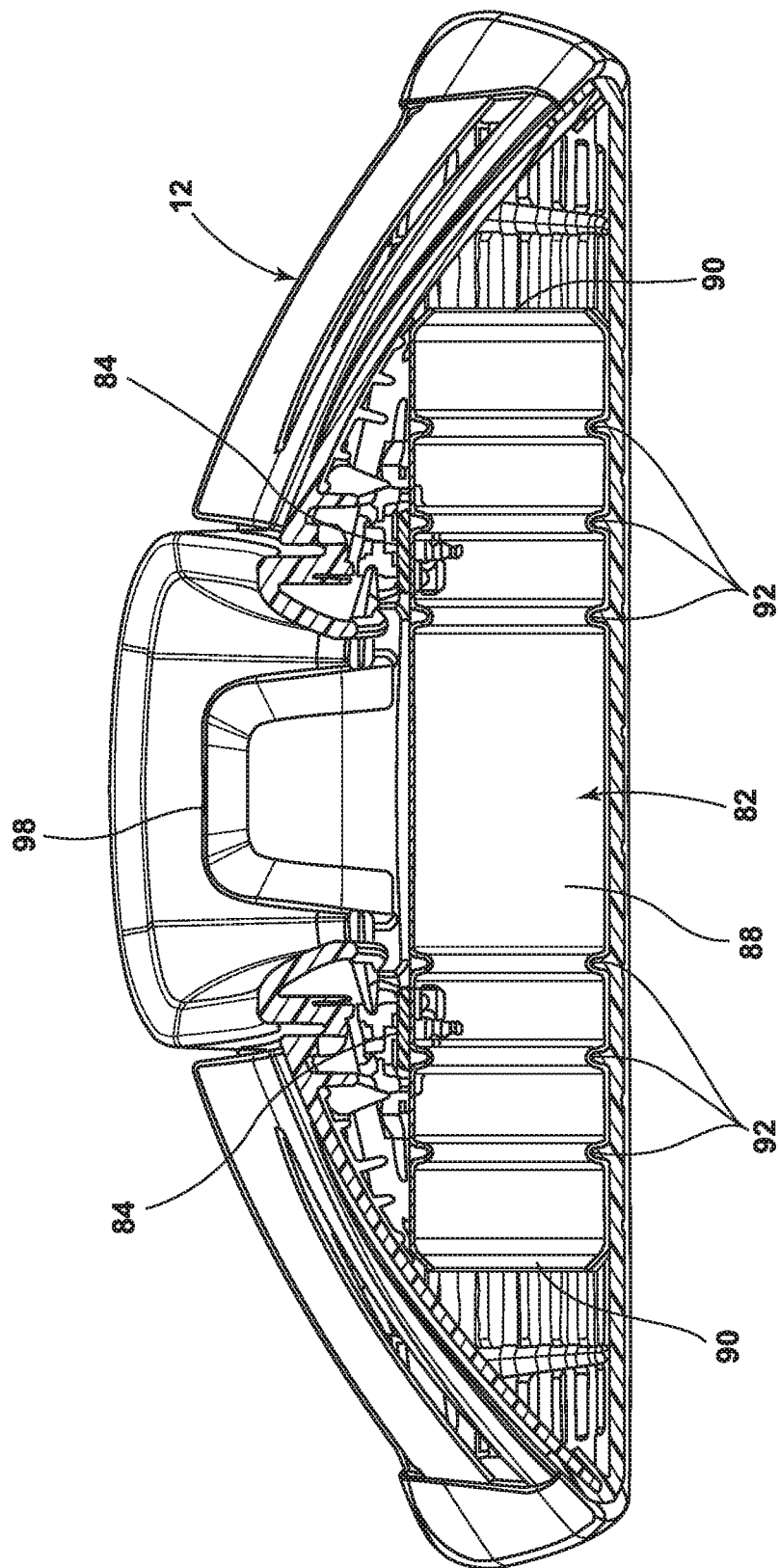
FIG. 18 is cross-sectional view of the back support, taken along line XVIII-XVIII of FIG. 28.
Figure 19:
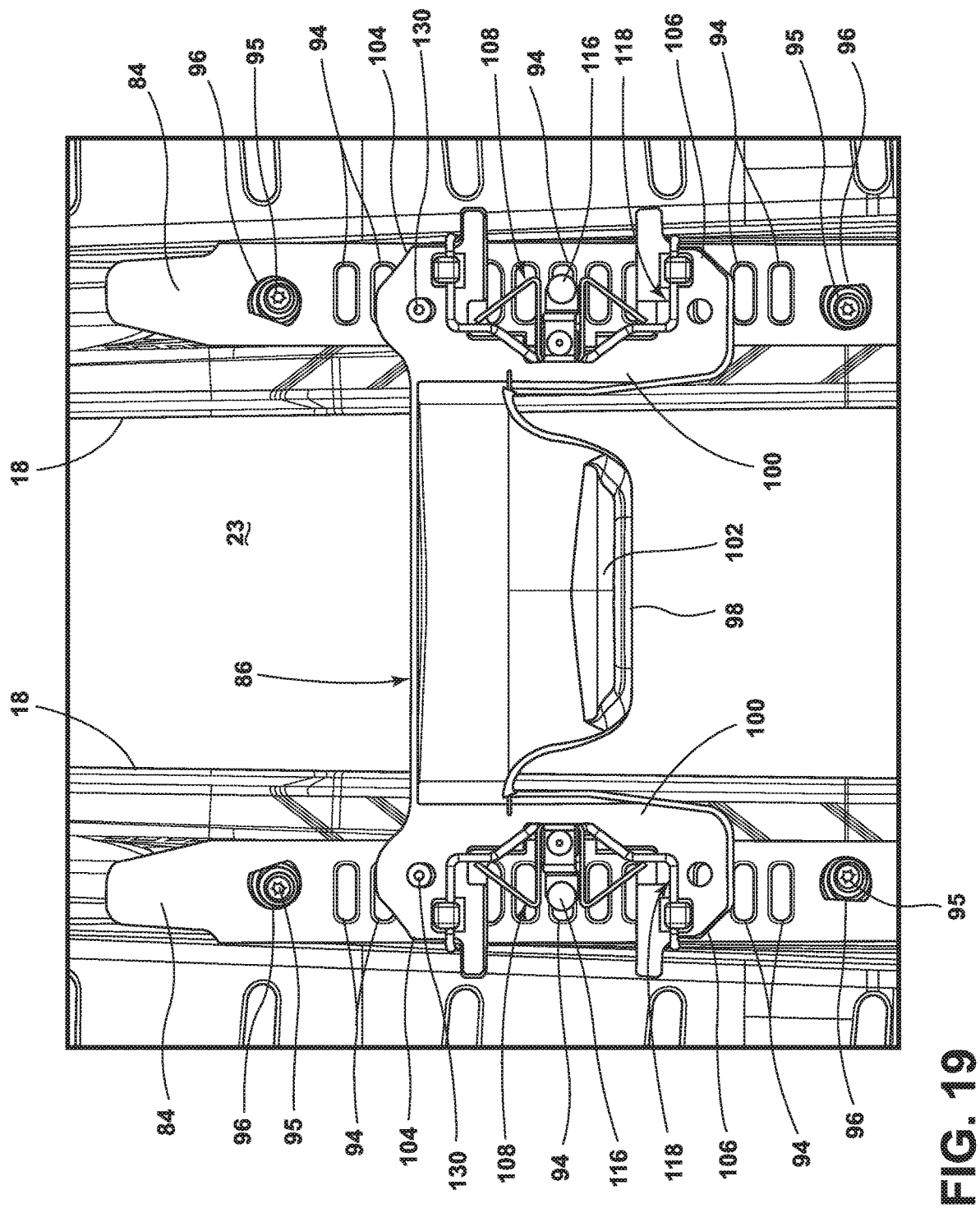
FIG. 19 is a front detail view of a carriage and tracks of the lumbar support unit of FIG. 17.
Figure 20:
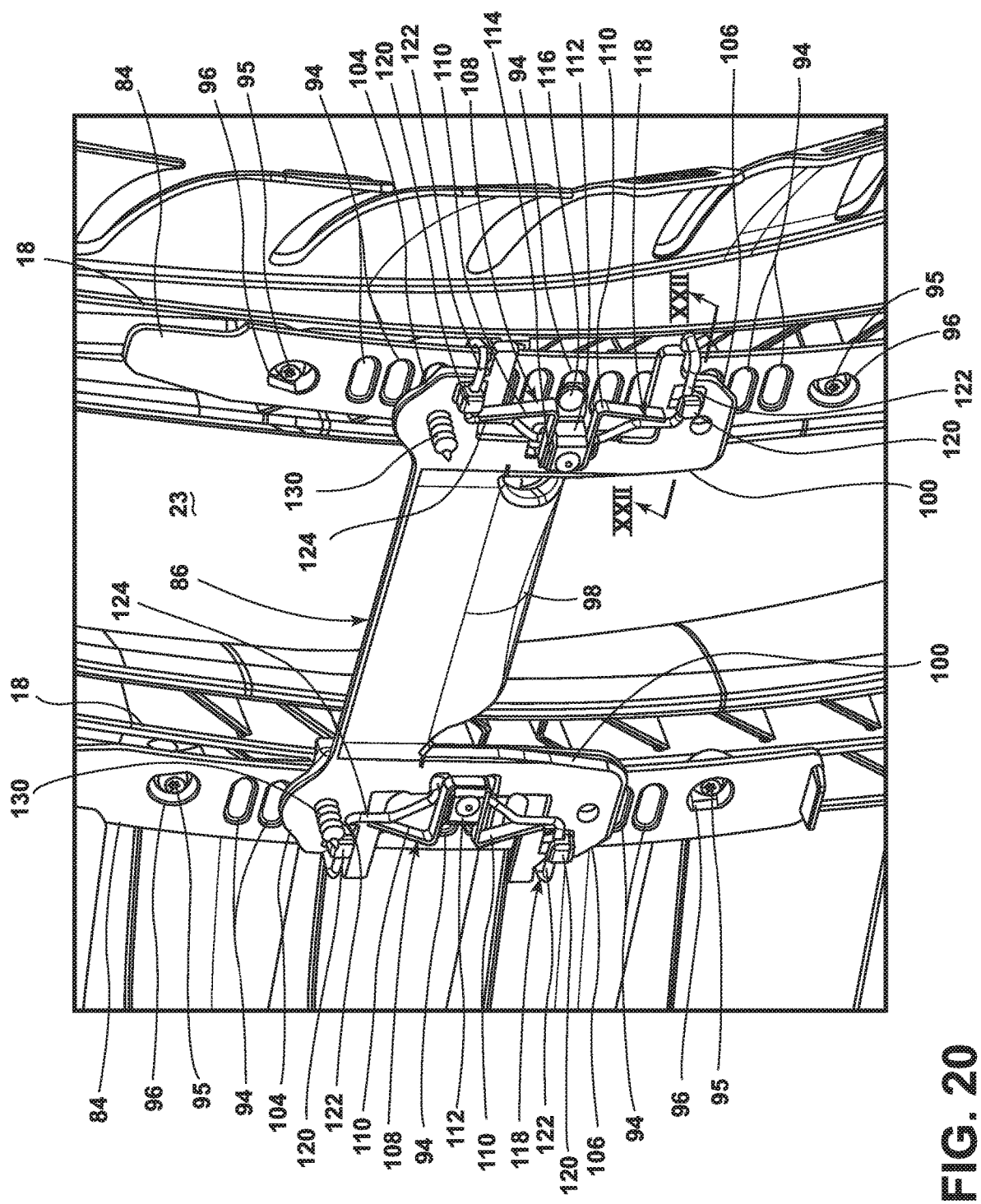
FIG. 20 is a front perspective detail view of the carriage and tracks.
Figure 21:
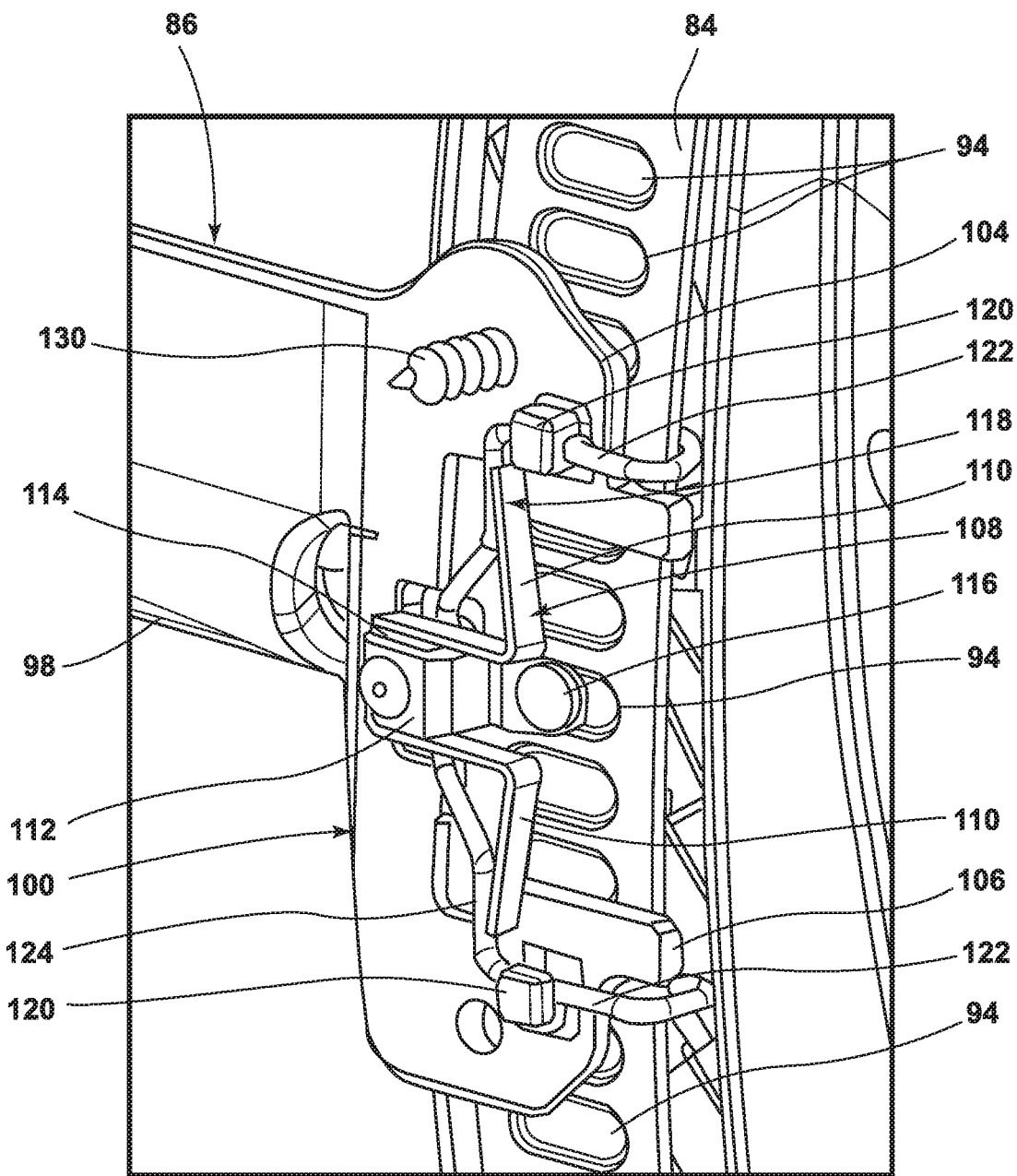
FIG. 21 is a front perspective detail view of a portion of the carriage and a track.
Figure 22:
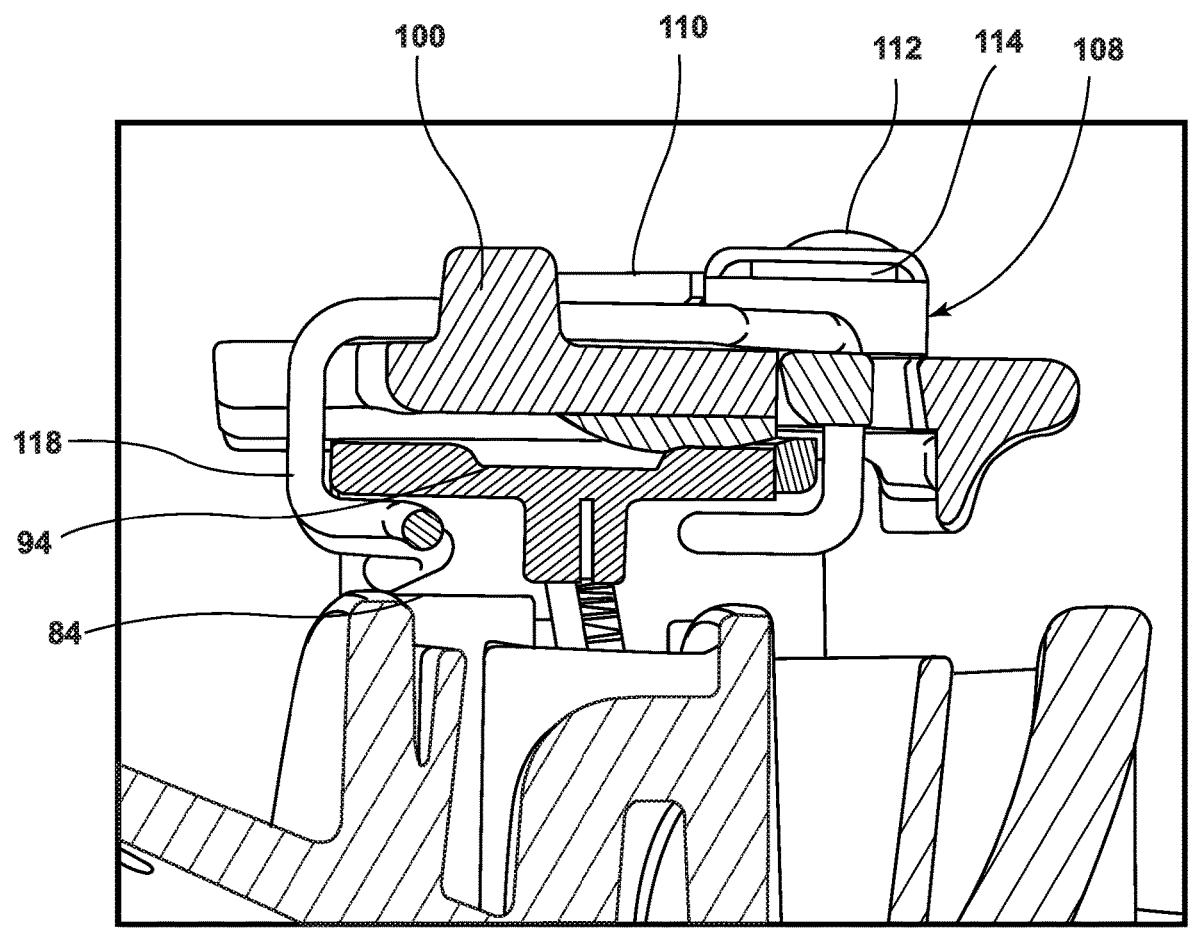
FIG. 22 is a cross-sectional view of the carriage and a track, taken along line XXII-XXII of FIG. 20.
Figure 23:
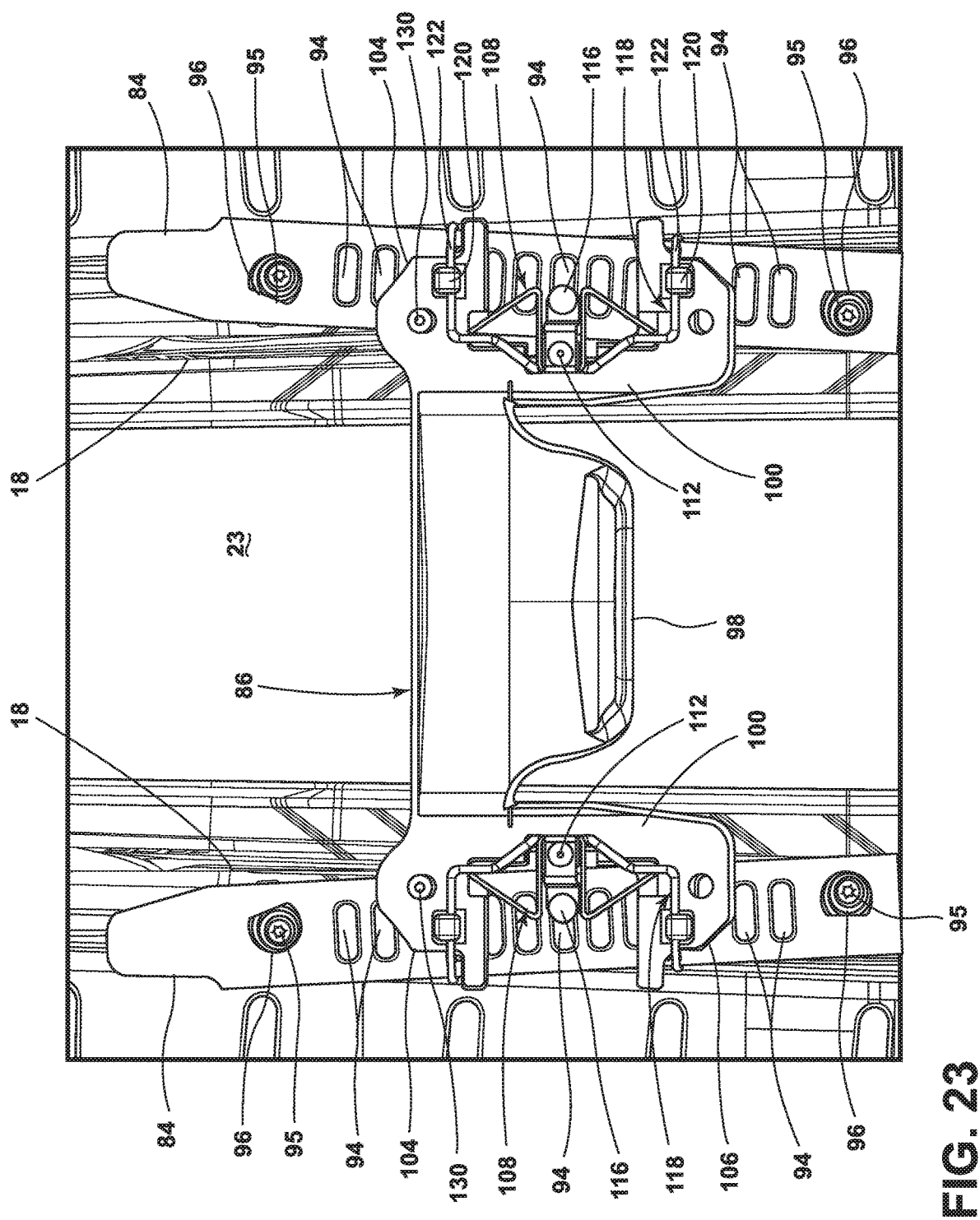
FIG. 23 is a front perspective detail view of the carriage and tracks, illustrating distorted track alignment.
Figure 25:
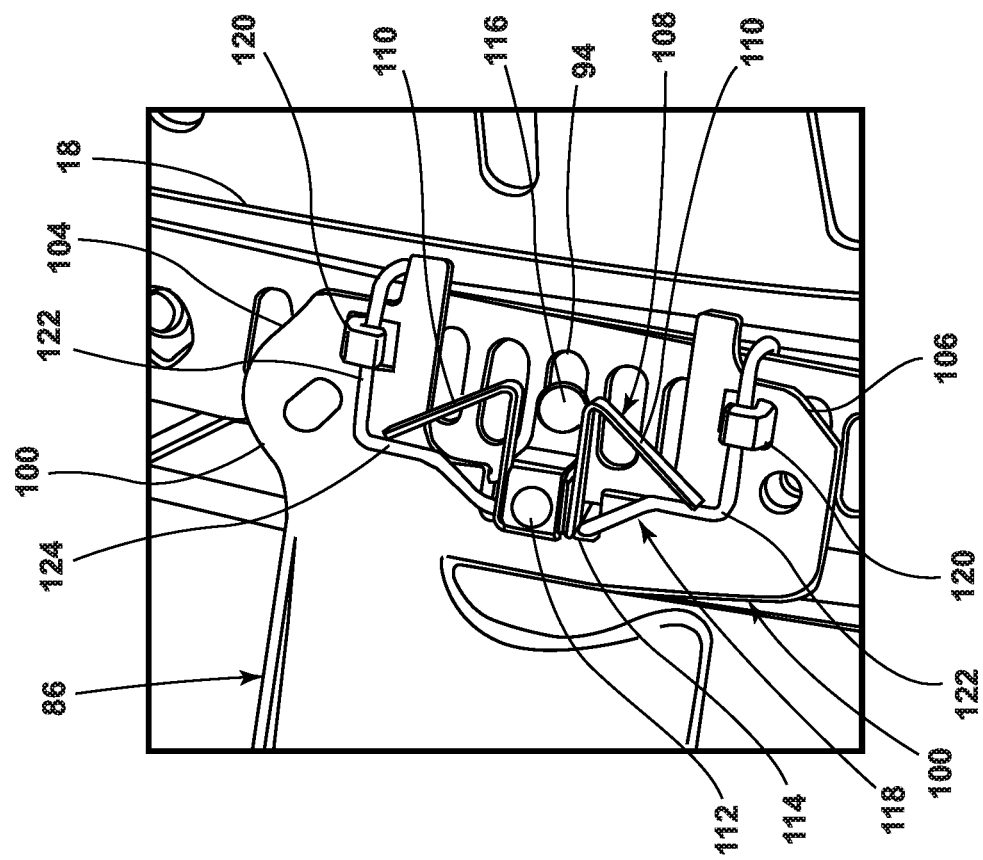
FIG. 25 is a front perspective detail view of a portion of the carriage and a track, illustrating distorted track alignment in the opposite direction.
Figure 24:
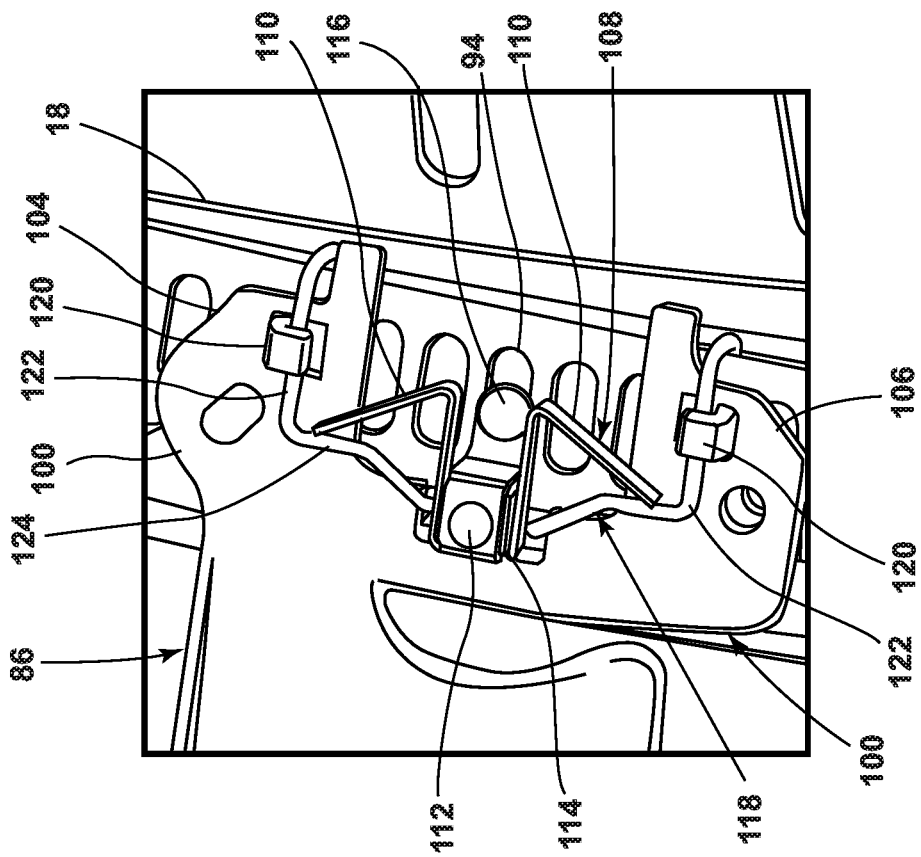
FIG. 24 is a front perspective detail view of a portion of the carriage and a track, illustrating distorted track alignment in one direction.
Figure 27:
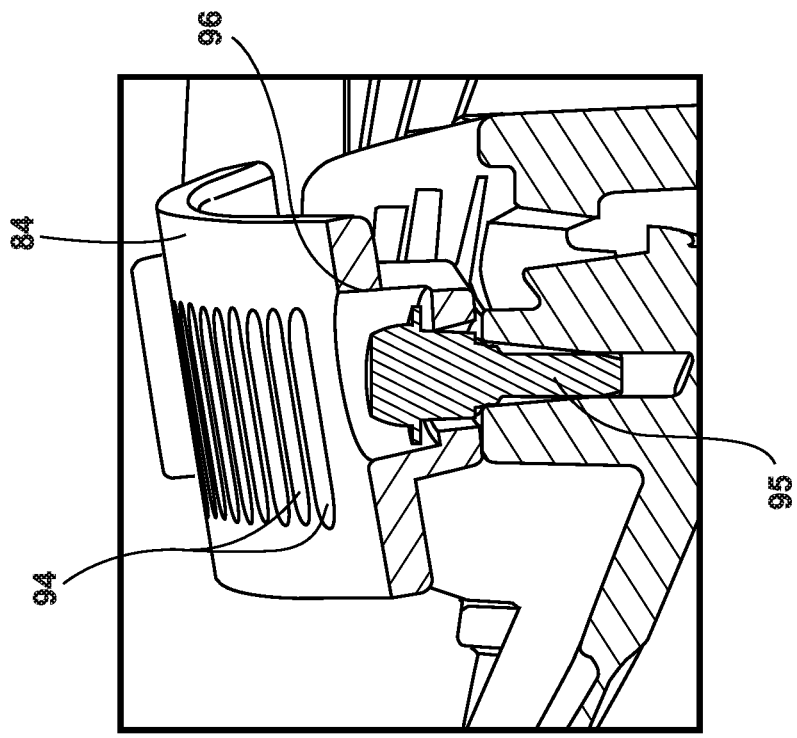
FIG. 27 is a cross-sectional view through a shoulder screw, track, and upright support post, illustrating flexibility of the attachment with the track angled in another direction.
Figure 26:
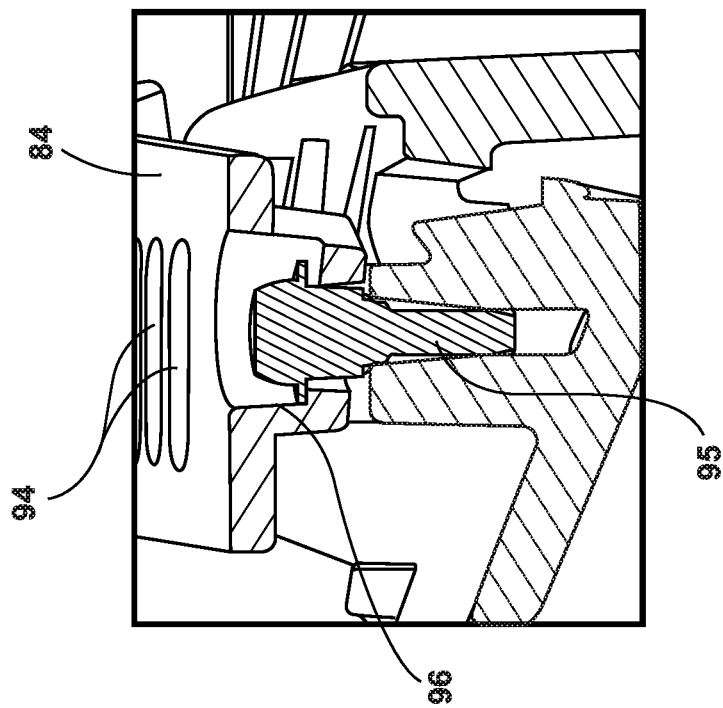
FIG. 26 is a cross-sectional view through a shoulder screw that mounts the track to an upright support post of the back support, illustrating flexibility of the attachment with the track angled in one direction.

The above back support 12 is presented in greater detail in connection with the flow chart of FIG. 16. In particular, the flow chart of FIG. 16 includes a method 200 of manufacturing the back support. The method 200 including: (a) molding the back support frame; (b) molding the suspension mesh; (c) mounting the lumbar support to the back support frame; and (d) mounting the back support frame to the suspension mesh.

Molding the back support frame is depicted as step 202 in FIG. 16. As described above, the support frame 16 includes the upright support posts 18, flexible support arms 20 that extend from the support posts 18, and a spline channel 28 that extends the length of the support posts 18. The support arms 20 are molded in a first curved position A where the support arms 20 curve slightly rearward, toward the rear of the chair 10.

Molding the suspension mesh back support is depicted as step 204. The suspension mesh 14 includes the integral retaining channel 48, radial arrays 46, and the horizontal and vertical tensioning support members 40, 42 that together form a flexible mesh.

Mounting the lumbar mechanism 80 to the support frame 16 is depicted as step 206 and generally includes affixing the tracks 84 to the support posts 18, affixing the lumbar pad 82 to the carriage 86, and mounting the carriage 86 between the tracks 84.

Figure 14:
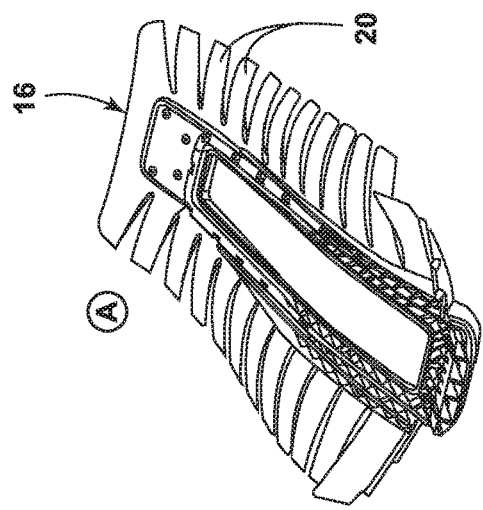
FIG. 14 is a front perspective view of the back support frame, illustrating the first curved position A.
Figure 15:
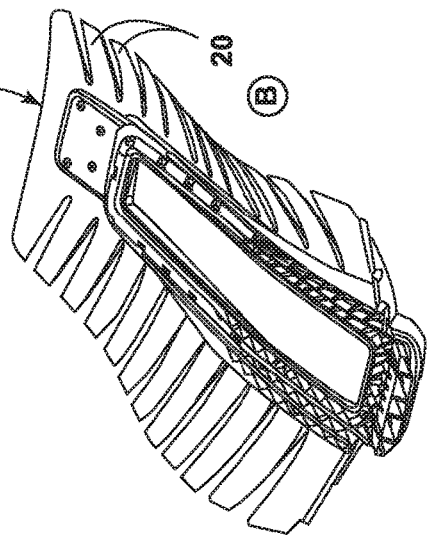
FIG. 15 is a front perspective view of the back support frame, illustrating the second curved position B.
Figure 13:
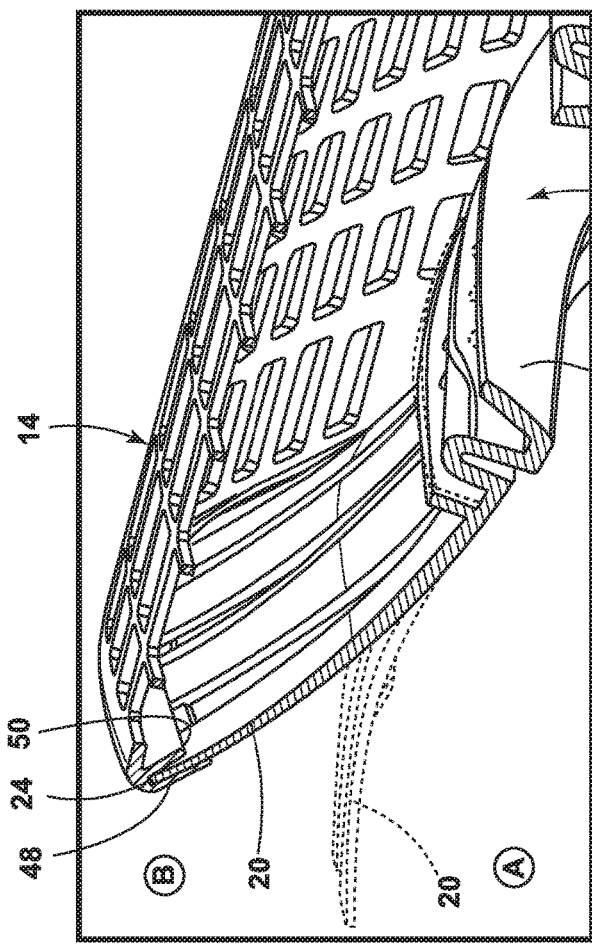
FIG. 13 is a detail and cross-sectional view of the back support frame mounted to the suspension mesh back support, illustrating a first curved position A and a second curved position B.

Mounting the support frame 16 to the suspension mesh 14 is depicted as step 208. Mounting the support frame 16 to the suspension mesh 14 includes generally aligning the components, flexing the support arms 20 forward, and inserting the peripheral edge 24 of each support arm 20 into the retaining channel 48 of the suspension mesh 14. During installation, the supports arms 20 are flexed from the first position A, shown in FIG. 14, into a second position B, shown in FIG. 15. The difference between first and second positions A and B is illustrated in FIG. 13. This second curved position B provides a state of tension between the support frame 16 and suspension mesh 14. In this fashion, the support frame 16 and suspension mesh 14 are readily assembled in a substantially fastener-less, self-retaining process. Further, the internal assembly force created by flexing the support arms 20 holds the support frame 16 and suspension mesh 14 interface secure. In addition, the support arms 20 can be removed from the retaining channel 48 without damaging the components, if needed or desired.

The method 200 continues with providing an upholstery cover, depicted as step 210. As described above, the upholstery cover 60 has a central opening 66 and an edging 68 knitted in the perimeter of the central opening 66. Step 210 also includes inserting an extrusion 70 into the edging 68.

Depicted as step 212, the method 200 continues with positioning the upholstery cover 60 over the assembled support frame 16 and suspension mesh 14. As described above, the upholstery cover 60 is a substantially contoured pocket with an open lower end 64. The upper edge of the assembled support frame 16 and suspension mesh 14 is inserted into the open lower end 64 of the upholstery cover 60, which is then pulled down into place. Once the upholstery cover 60 is in place, the edging 68, with the extrusion 70 disposed therein, is pressed/inserted into the spline channel 28 in the upright support posts 18 of the support frame 16, as depicted in step 112. This configuration attaches the upholstery cover 60 to the support frame 16, enabling the upholstery cover 60 to be mounted to the back support 12 without additional fasteners or adhesive.

Lastly, the assembled back support 12 may be affixed to a chair frame to complete the office chair 10, depicted as step 214. A fastener, such as a conventional screw, is installed, from a lower surface, through the base 5 and into the wedge base 22, connecting the components primarily in tension.

The back support 12 described herein provides a compliant backrest that flexes to accommodate a large range of motion and postures of the seated occupant. Further, the individualized nature of the support arms 20 allows for localized flexing to accommodate postural movements of the occupant, for example reaching or changes in seated posture. When an occupant sits in the chair 10, the flexible support arms 20 and suspension mesh 14 comply with the back of the individual, increasing the contact area between the back support 14 and the occupant's back, while continuing to bias them towards the desired ergonomic contour provided by the suspension mesh.

In summary, the support characteristics of the back support 12 may be tuned to a desired profile by varying the features of the back support frame. Support characteristics of the suspension mesh 14, support frame 16, and lumbar mechanism 80 are each individually modifiable, and the modifications to the individual components in combination with one another effects the overall support characteristic of the back support 12. Modifying a characteristic on one component may affect the characteristics of another component and/or the back support itself. For example, increasing the initial curvature of the support arms 20, which requires more flexing of the support arms 20 to attach and retain the suspension mesh 14, and creates greater tension in the support frame 16.

Combinations of modifications to the individual components results in highly customizable support characteristics available to design into the office chair. Possible combinations of modifications include: (1) number and spacing of the support arms 20; (2) length and thickness of the support arms 20; (3) initial curvature of the support arms 20; (4) width, thickness and spacing of the horizontal and vertical tensioning support members 40, 42 of the suspension mesh 14; (5) width, thickness and spacing of the radial arrays 46 of the suspension mesh 14; (6) degree of stretch of the upholstery fabric 60; (7) positioning of the lumbar mechanism 80; (8) flexibility of the material used in the lumbar pad 82; and (9) spacing and number of annual support ribs 92 of the lumbar pad 82.

The components of the back support 12 of the present invention are readily assembled in a substantially fastenerless manufacturing process. The support frame 16 is mounted to the suspension mesh 14 without requiring any type of additional fastener, such as traditionally used screws or clips. In addition, the support frame 16 can be removed from the suspension mesh 14 without damaging either component. This is advantageous in the case that one of the support frame 16 or suspension mesh 14 is damaged or defective; the component can be removed, reworked, or reassembled, without having to scrap the viable remaining component. The upholstery cover 60 is also readily assembled in a substantially fastenerless process. With the cover 60 in place, the edging 68 and extrusion 70 are pressed into the spline channel 28 on the support frame 16. Again, the cover 60 can be removed therefrom without damaging either component. Accordingly, the back support 12 is readily assembled without the required use of tools.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Features of various embodiments may be used in combination with features from other embodiments. Directional terms, such as "vertical," "horizontal," "top," "bottom," "front," "rear," "upper," "lower," "inner," "inwardly," "outer," "outwardly," "forward," and "rearward" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the" or "said," is not to be construed as limiting the element to the singular.

The embodiments of the invention in which an exclusive property or privilege is claimed are defined as follows:

1. A back support for a chair, comprising:
   a flexible back support surface having a front user facing side and a rear side opposite the front side, the flexible back support surface having a vertical extent that includes a thoracic region, a lumbar region and a pelvic region; and
   a lumbar mechanism positioned adjacent the rear side of the flexible back support surface, the lumbar mechanism including a flexible lumbar pad having a first portion in contact with the rear side of the flexible back support surface in at least the lumbar region, wherein the flexible lumbar pad is adjustable to engage multiple positions along the vertical extent of the rear side of the flexible back support surface by rolling the flexible lumbar pad on the rear side of the flexible back support surface such that a second portion of the flexible lumbar pad contacts the rear side of the flexible back support surface, while the first portion remains fixed in contact with the same portion of the flexible back support surface.

2. The back support of claim 1 wherein the lumbar mechanism includes a carriage fixedly attached to the lumbar pad, the carriage including a handle extending outwardly from the lumbar pad in a direction away from the rear side of the flexible back support surface such that a user can adjust the lumbar pad to engage and disengage the second portion along the vertical extent by manipulating the handle.

3. The back support of claim 2 wherein the first portion of the lumbar pad is spaced from the carriage and is fixed in position on the rear side of the flexible back support surface, wherein the adjustment of the lumbar pad causes the lumbar pad to roll along the rear side by deformation of the lumbar pad, and to engage and disengage the second portion of the lumbar pad with the rear side of the flexible back support surface while the first portion remains fixed in position on the rear side of the flexible back support surface.

4. The back support of claim 3 wherein the lumbar pad is a flexible tubular cushion, and wherein the first portion in contact with the rear side of the flexible back support surface is curved.

5. The back support of claim 4 including a back frame supporting the flexible back support surface, the lumbar mechanism positioned between the back frame and the flexible back support surface.

6. The back support of claim 5 wherein the back frame includes a pair of spaced apart upright posts defining a window therebetween, the handle of the lumbar mechanism protruding through the window such that a user can access the handle to adjust the lumbar mechanism.

7. The back support of claim 6 wherein at least a portion of the lumbar pad is visible through the window.

8. A back support for a chair, comprising:
a flexible back support surface having a front user facing side and a rear side opposite the front side; and
a lumbar mechanism including a flexible lumbar pad positioned on the rear side of the flexible back support surface,
wherein the position of the lumbar pad is adjusted along the rear side of the flexible back support surface by rolling the flexible lumbar pad in continuous rolling engagement with the rear side of the flexible back support surface while at least a portion of the lumbar pad remains fixed in the same position with respect to a portion of the flexible back support surface.

9. The back support of claim 8 wherein the lumbar pad defines at least first, second, and third portions and the lumbar pad is positionable in at least raised, nominal, and lowered positions, and wherein adjusting the position of the lumbar pad engages different ones of the first, second, and third portions with the rear side of the flexible back support surface, and wherein in the raised position, the lumbar pad is rolled such that the first and third portions engage the rear side of the flexible back support surface, and in the lowered position, the lumbar pad is rolled such that the first and second portions engage the rear side of the flexible back support surface, and wherein in the nominal position, the lumbar pad is rolled such that the first portion engages the rear side of the flexible back support surface.

10. The back support of claim 8 wherein the lumbar pad is a hollow, flexible, cylindrical cushion.

11. The back support of claim 10 wherein the lumbar pad is deformed out of the cylindrical shape when subjected to a load from a user pressing against the flexible back support surface.

12. The back support of claim 8 including a handle extending outwardly from the lumbar pad, wherein a user can use the handle to adjust the position of the lumbar pad between raised, nominal, and lowered positions.

13. The back support of claim 12 wherein a portion of the lumbar pad spaced from the handle is fixed in position on the rear side of the flexible back support surface, wherein the adjustment of the lumbar pad causes the lumbar pad to roll along the rear side by deformation of the lumbar pad.

14. The back support of claim 12 wherein
the lumbar pad is a hollow, flexible, cylindrical cushion having a pair of longitudinal ends, and an interior surface and an exterior surface between the longitudinal ends;
wherein the handle is attached to the exterior surface of the flexible lumbar pad between the longitudinal ends and extending outwardly from the exterior surface of the lumbar pad;
wherein the flexible lumbar pad is adjustable to different positions along the vertical extent of the flexible back support surface by movement of the handle.

\* \* \* \* \*